(12) United States Patent
Daniels

(10) Patent No.: US 10,481,315 B2
(45) Date of Patent: Nov. 19, 2019

(54) METHOD AND APPARATUS FOR ENCAPSULATING A LIGHT SOURCE

(71) Applicant: John James Daniels, Madison, CT (US)

(72) Inventor: John James Daniels, Madison, CT (US)

(*) Notice: Subject to any disclaimer, the term of this patent is extended or adjusted under 35 U.S.C. 154(b) by 231 days.

(21) Appl. No.: 14/944,643

(22) Filed: Nov. 18, 2015

(65) Prior Publication Data

US 2016/0320048 A1 Nov. 3, 2016

Related U.S. Application Data

(60) Provisional application No. 62/084,544, filed on Nov. 25, 2014.

(51) Int. Cl.
| | |
|---|---|
| *F21V 8/00* | (2006.01) |
| *A63G 31/00* | (2006.01) |
| *F21V 31/00* | (2006.01) |
| *F21V 33/00* | (2006.01) |
| *F21S 2/00* | (2016.01) |
| *G09F 19/22* | (2006.01) |
| *F21V 29/89* | (2015.01) |
| *F21Y 115/10* | (2016.01) |

(52) U.S. Cl.
CPC ............ *G02B 6/0008* (2013.01); *A63G 31/00* (2013.01); *F21S 2/00* (2013.01); *F21V 31/00* (2013.01); *F21V 33/006* (2013.01); *G02B 6/0006* (2013.01); *G09F 19/22* (2013.01); *G09F 19/228* (2013.01); *F21V 29/89* (2015.01); *F21Y 2115/10* (2016.08); *G09F 2019/223* (2013.01)

(58) Field of Classification Search
CPC ... G09F 19/22; G09F 19/228; G09F 2019/223
USPC ....................................... 362/153, 153.1, 576
See application file for complete search history.

(56) References Cited

U.S. PATENT DOCUMENTS

| | | | | |
|---|---|---|---|---|
| 6,082,886 A | * | 7/2000 | Stanford | ............... F21V 33/006 362/153.1 |
| 7,131,761 B2 | * | 11/2006 | Pipo | ....................... E01C 17/00 362/559 |

(Continued)

*Primary Examiner* — Laura Tso
(74) *Attorney, Agent, or Firm* — John J. Daniels, Esq.

(57) ABSTRACT

An apparatus and method for encapsulating a light source within a water-tight, robust encapsulating bulk for use, among other things, as a walk paver. The apparatus and method provides a strong, durable, waterproof illuminated paver that includes an array of individually addressable light sources, having the aesthetic appearance of a conventional stone material. A light guide is provided having a light receiving end and a light transmissive end. A light source is provided having a selective on state and a selective off state. The light source is optically coupled to the light receiving end of the light guide to form a light engine comprising the light source and the light guide. The optically coupled light guide and light source are encased within an encapsulating bulk, wherein the encapsulating bulk includes at least one viewable surface, and where the light transmissive end of the light guide is viewable at said at least one viewable surface. An obscuring layer is formed on one or more of the at least one viewable surface for obscuring the transmissive end of the light guide from view when the light source is in the selective off state.

18 Claims, 25 Drawing Sheets

(56) References Cited

U.S. PATENT DOCUMENTS

| | | | | |
|---|---|---|---|---|
| 7,229,203 B2* | 6/2007 | Lath | ........................ | G01V 8/10 |
| | | | | 362/153.1 |
| 8,087,810 B2* | 1/2012 | Isaacson | ................... | A63J 5/02 |
| | | | | 362/552 |
| 8,905,571 B2* | 12/2014 | Sigler | ................. | G02B 6/0096 |
| | | | | 362/153 |
| 2003/0156405 A1* | 8/2003 | Kim | ....................... | E01F 9/559 |
| | | | | 362/153.1 |
| 2004/0032748 A1* | 2/2004 | Trudeau | ............. | B28B 23/0037 |
| | | | | 362/554 |
| 2004/0213020 A1* | 10/2004 | Gotfried | ............. | G02B 6/0006 |
| | | | | 362/576 |
| 2006/0198128 A1* | 9/2006 | Piepgras | ................ | B29C 39/10 |
| | | | | 362/147 |
| 2006/0291196 A1* | 12/2006 | Benavente | .............. | E01F 9/559 |
| | | | | 362/153.1 |
| 2007/0159814 A1* | 7/2007 | Jacobsson | ............... | E04F 15/02 |
| | | | | 362/153 |
| 2009/0003013 A1* | 1/2009 | Lee | ....................... | G02B 6/001 |
| | | | | 362/576 |
| 2010/0188842 A1* | 7/2010 | Yohananoff | ............. | E01C 17/00 |
| | | | | 362/153.1 |
| 2014/0328052 A1* | 11/2014 | Hochman | .............. | F21V 21/02 |
| | | | | 362/147 |

* cited by examiner direct wire connection and/or inductive charging and/or signal communication Assembled Componets Process:

Step One:
Provide Substrate Scafold With Pocket

Step Two:
Provide Lightguide Assembly

Step Three (a): Fix Lightguide Assembly to LED PCB or Substrate Scafold with Pocket Step Three (b): Fix Lightguide Assembly to Substrate Scafold with Pocket Step Four: Encapsulate Lightguide Assembly/LED PCB in encasulating medium (encapsulation of either Assembly of Step 3(a) or 3(b))

Step Four:
Encapsulate Lightguide Assembly/LED PCB in encasulating medium
(encapsulation of either Assembly of Step 3)

Step Five (optional):
Machine away excess hardened encapsulting medium
 to expose light guides light emitting ends Step Six (optional):
Apply hard face over light emitting surface
(Note: in this case, the light emitting surface is the face of the stone/lightguides Step Six(a) (optional):
Incorporate light scattering particulate in hard face Step Seven (optional):
Apply non-skid surface over light emitting surface
(note: in this case, the light emitting surface is the face of the hard face)

Figure 12

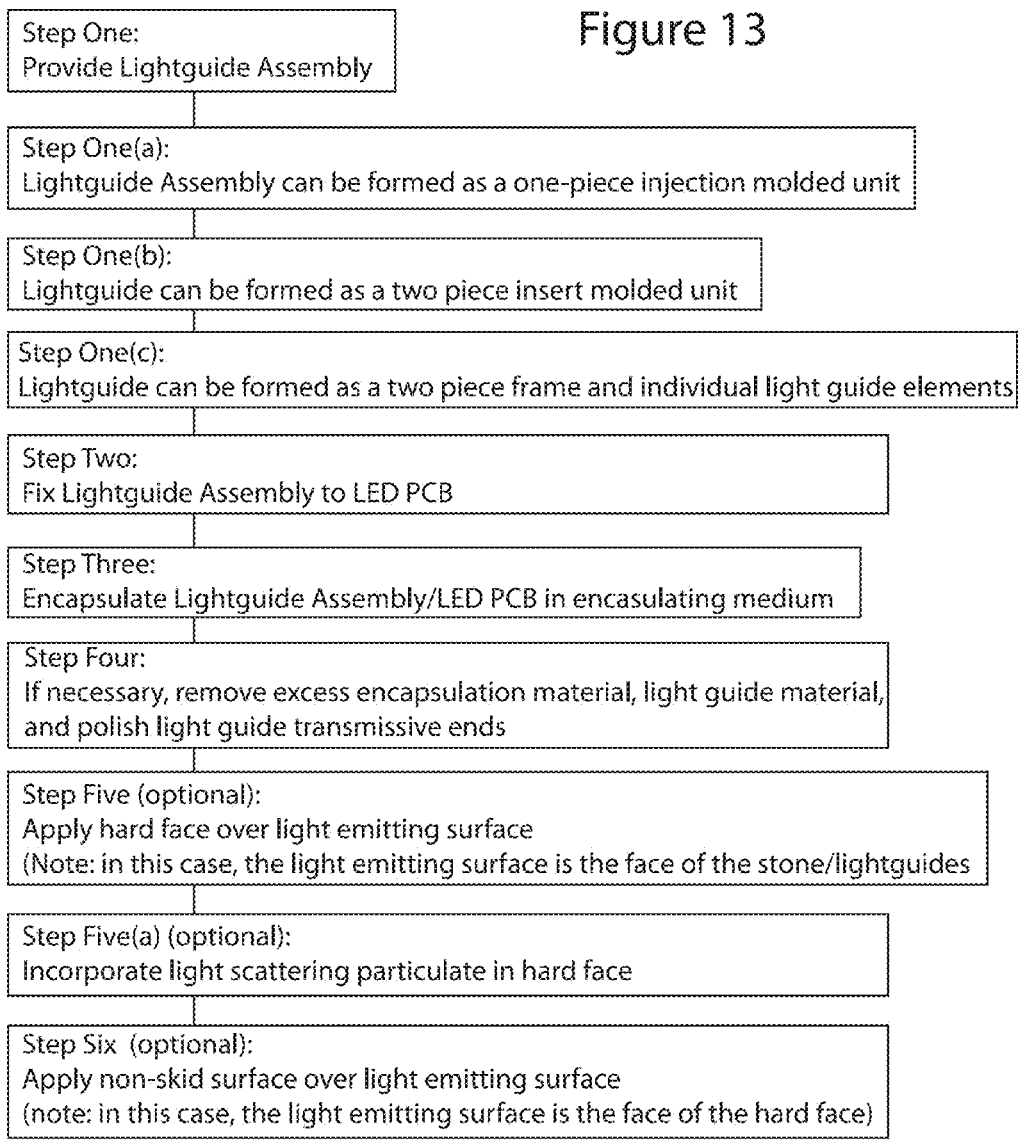

Top surface of bondo/stone powder encapsulant is flattened and honed to reveal as much of the LED lens as desired.

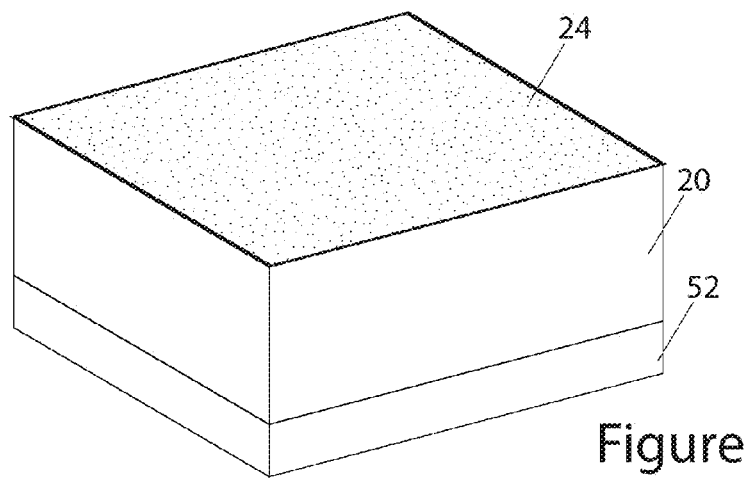
Figure 17
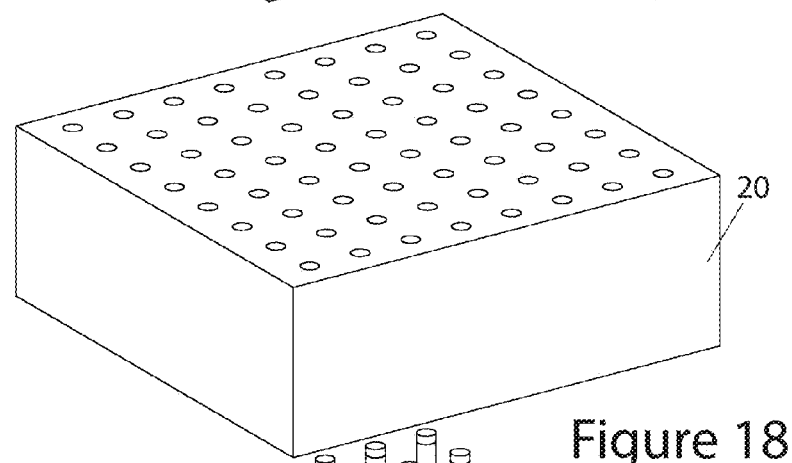
Figure 18
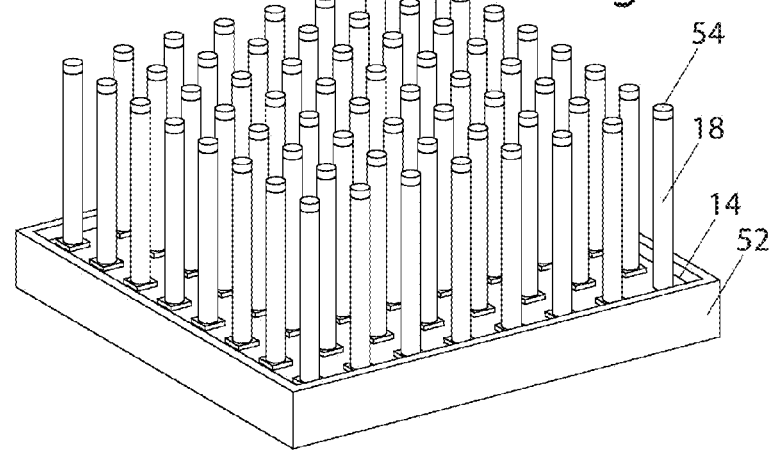

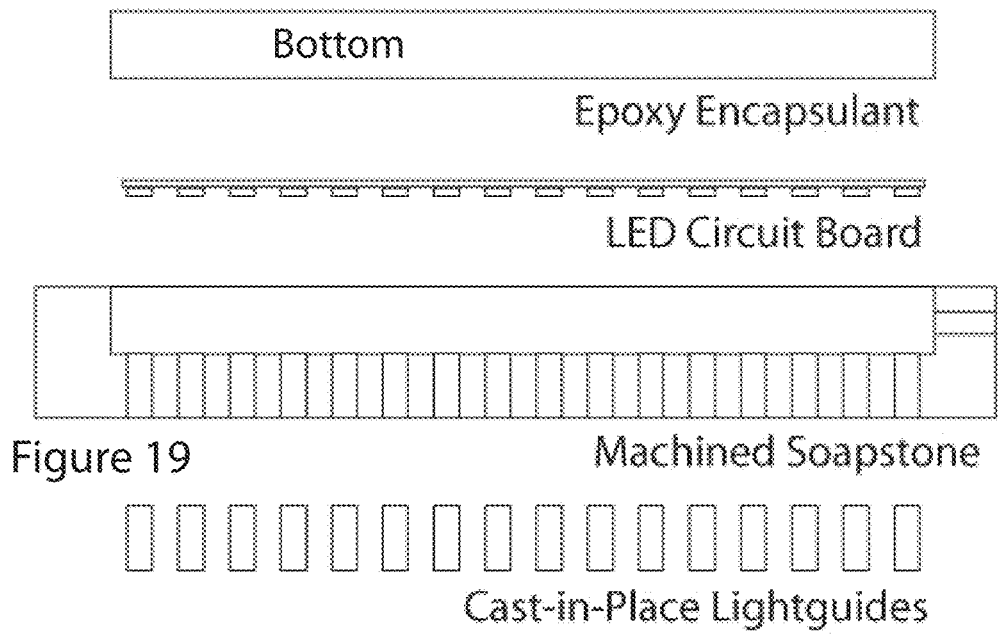
Figure 19 — Cross Section of LED Paver
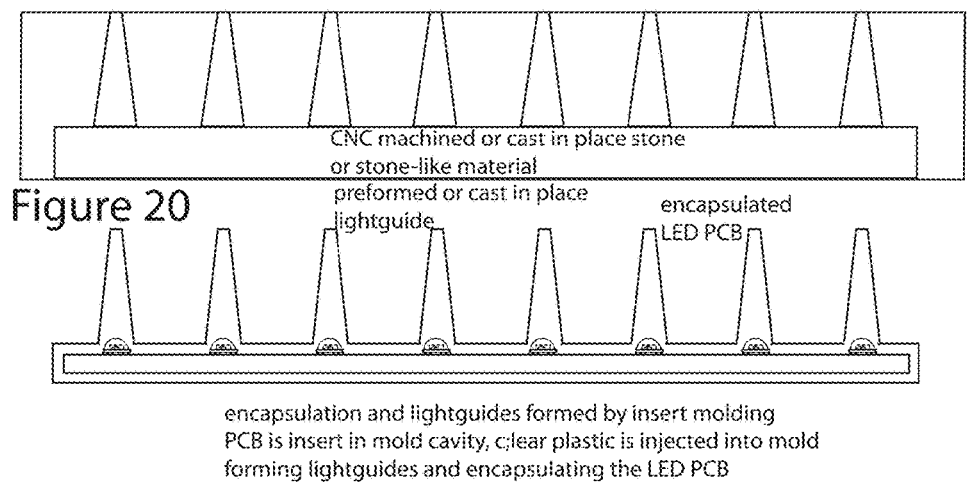
Figure 20
encapsulation and lightguides formed by insert molding
PCB is insert in mold cavity, clear plastic is injected into mold forming lightguides and encapsulating the LED PCB

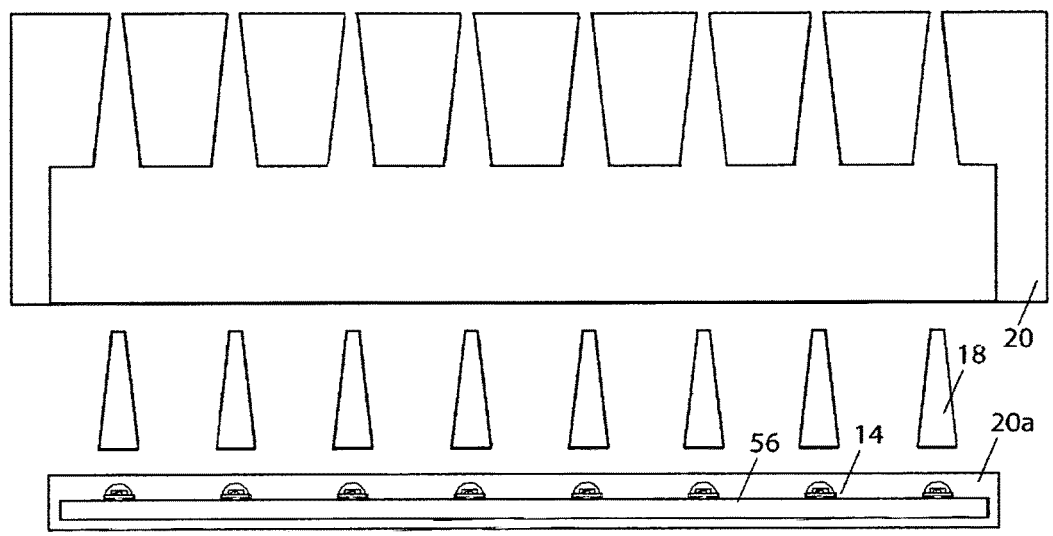
encapsulated LED PCB    Figure 21    preformed or cast in place lightguide
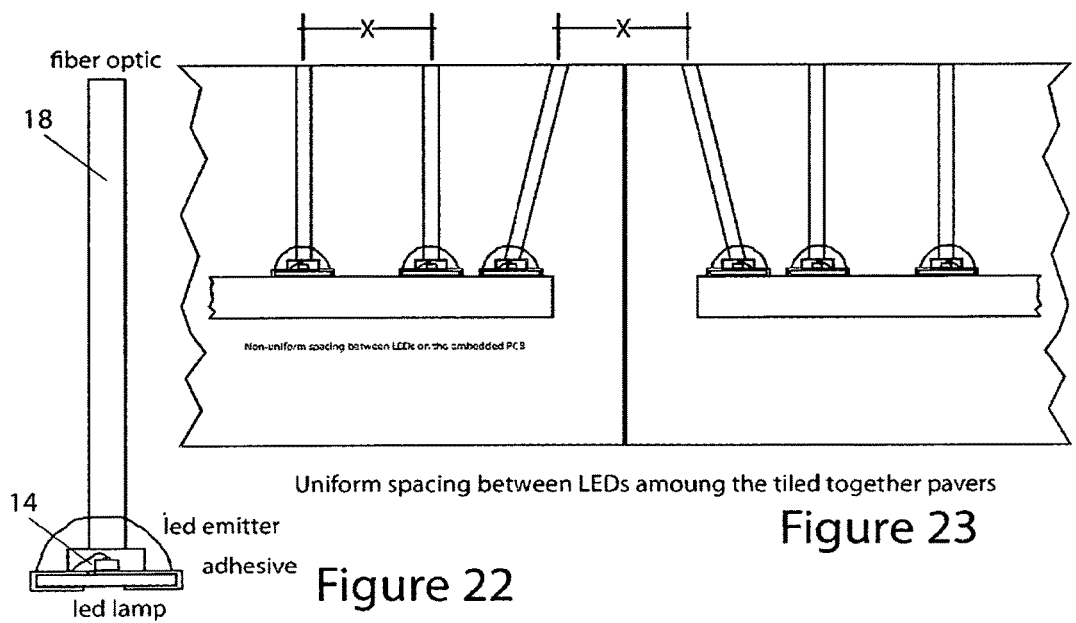
Figure 22
Uniform spacing between LEDs amoung the tiled together pavers
Figure 23

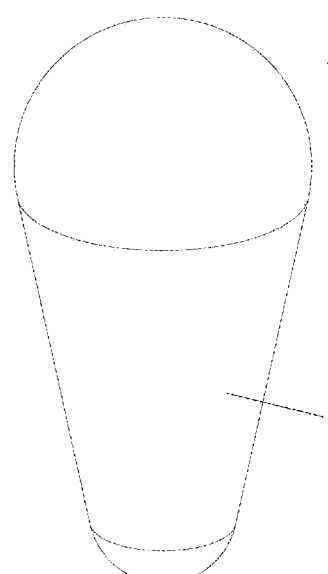
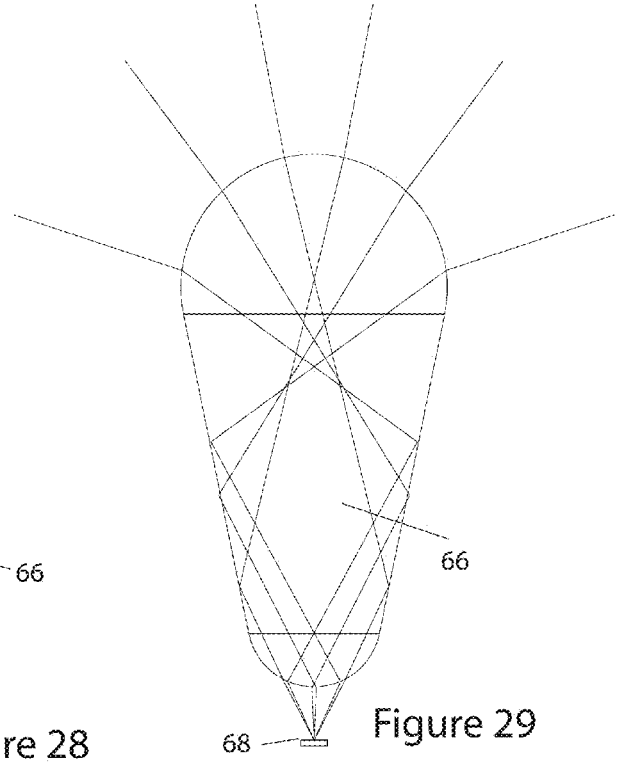
Figure 28
Figure 29
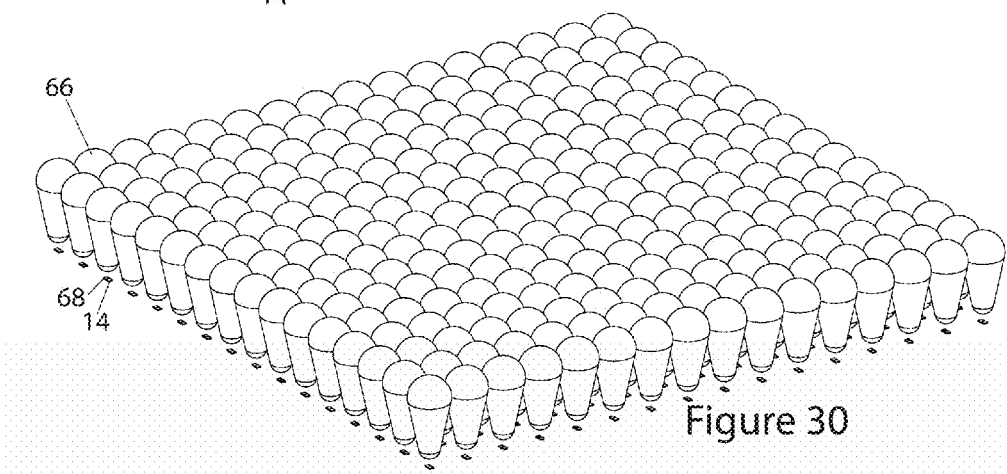
Figure 30

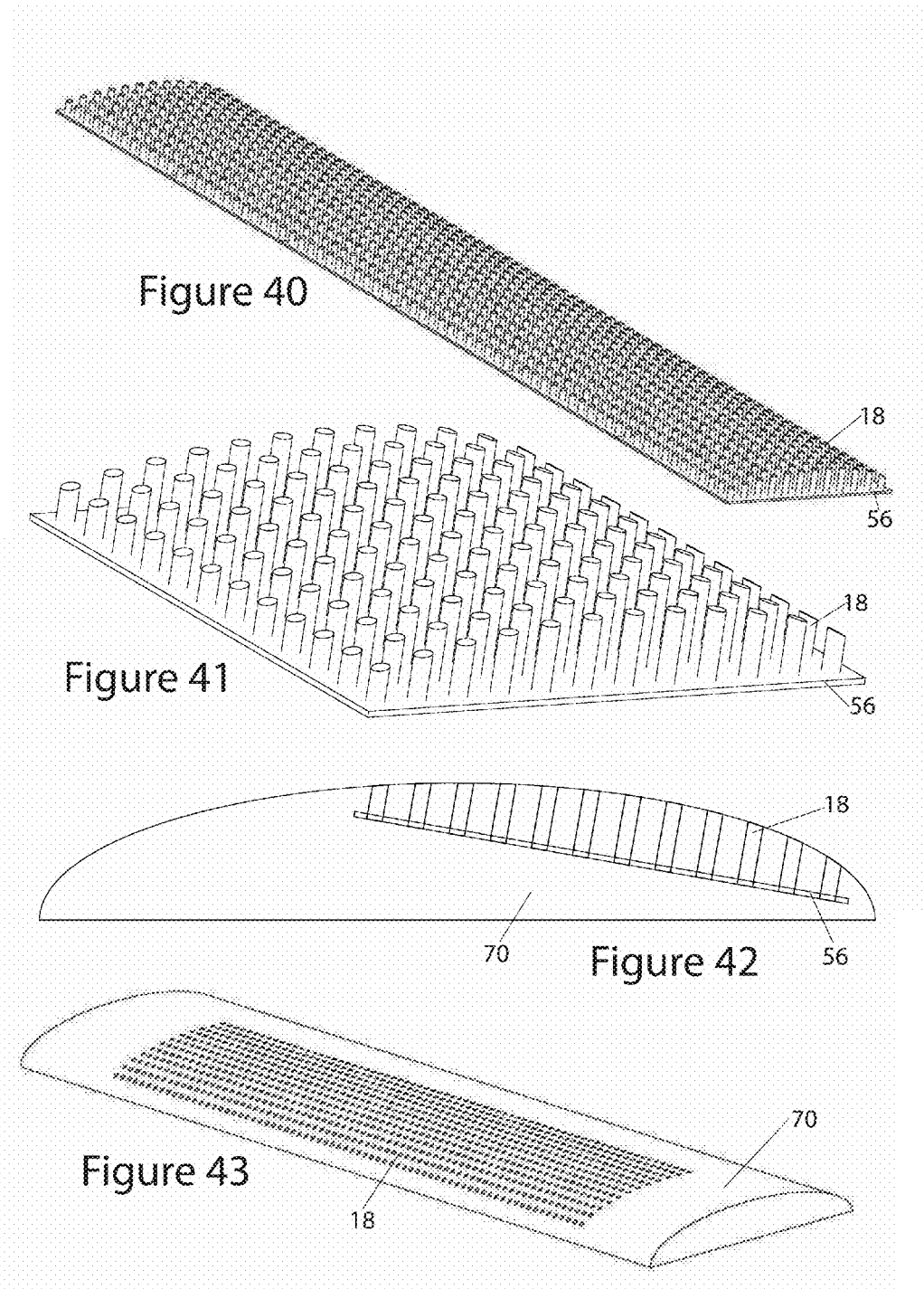

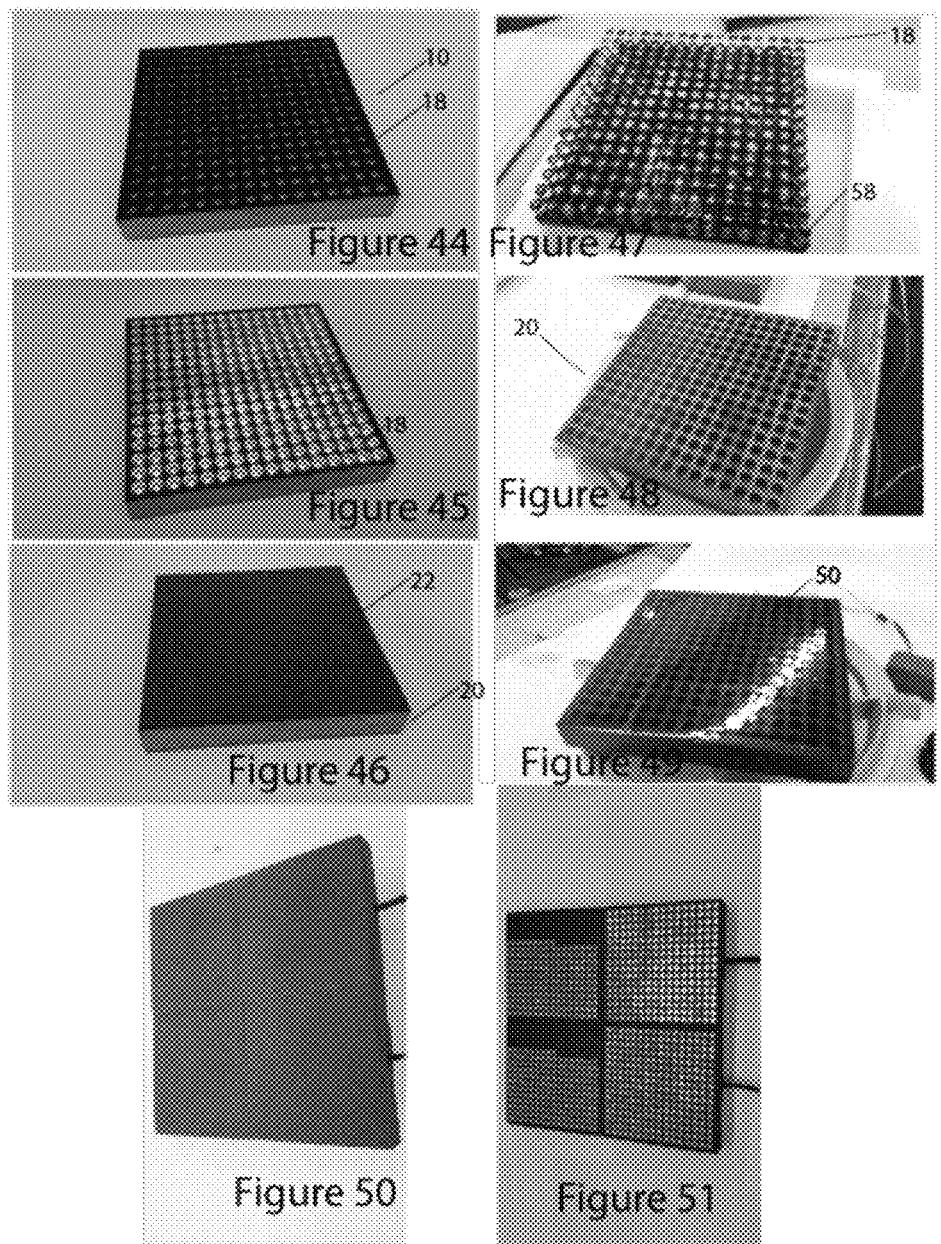

Normal State

Direct video feed from ride

Twilight Zone animation

Cloaking (appear to see through)

Logo animation

Cloaking with "floating" logo

METHOD AND APPARATUS FOR ENCAPSULATING A LIGHT SOURCE

CROSS REFERENCE TO RELATED APPLICATIONS

This Application is a U.S. Utility Application of Provisional Patent Application 62/084,544, filed Nov. 25, 2014 entitled "A Method and Apparatus for Encapsulating a Light Source", which is incorporated by reference herein.

BACKGROUND

The present invention relates to an apparatus and method for encapsulating a light source within a water-tight, robust encapsulating bulk for use, among other things, as a walk paver, wall material, message board, entertainment system, lighting device, pathway lighting, display system, driveway lighting, roadway lighting and the like.

There are many examples of conventional paving stones, commonly referred to as "pavers" used to make driveways, walkways and patios. A typical paver is a solid block of natural stone, or a cast stone-like material such as concrete or so-called "cultured stone".

Recently, pavers have been provided that include cavities that are used to house light sources, such as filament bulbs, electroluminescent or LEDs. Typically, an illuminated paver is either connected electrically by buried wires to a low voltage power source or is a self-contained unit which may include a solar cell to charge a battery included in the cavity along with the light source. Usually, the light source is a single color, and often is comprised of a single bulb or packaged lamp. It is difficult to make an electronic device that is protected from water ingress, and often times a low voltage power source, such as 12 volts DC is used to reduce the potential for a shock hazard. It is also difficult to provide adequate structural support, in particular if the paver includes a cavity having an air gap. The cavity does not support compressive loading, so to make the paver durable enough to be driven over care must be taken to include adequate vertical support to prevent the cavity from collapsing under a load, such as an automobile. Additionally or alternatively, the paver can be dimensioned so that relatively little load has to be supported in the area of the cavity. However, in this case, the paver is limited in size. Also, an illuminated paver typically looks much different than a conventional stone paver, and may have, for example, a translucent top surface to make viewable at the top surface of the paver the light generated by the light source disposed in the cavity. The typical illuminated paver is a relatively small, single color, single light source device that looks considerably different than the surround stone materials from which a driveway, walkway or patio are constructed. The single light source of a conventional paver is limited in its ability to convey a message or provide enhanced entertainment and lighting features. Accordingly, there is a need for a strong, durable, waterproof illuminated paver that includes an array of individually addressable light sources, and that has the aesthetic appearance of a conventional stone material.

There are other applications for a strong, durable, waterproof illuminated building material that includes a light source, and that has the aesthetic appearance of a conventional stone material. For example, wall, signage, monument, fountain, swimming pool, and other structural and/or information conveying applications exist where a light source that replicates, simulates or approximates the outward appearance of a conventional stone, wood, other building materials, and other natural or man-made objects.

Also, detectable warning pavers are often desired and may be a governmentally imposed requirement where a pedestrian crossing blends with the vehicular road, for example, without a railing or a curb. Under the ADA or Americans with Disabilities Act of 1991, such detectable warnings need to mark particular common intersections of vehicle traffic and pedestrian, as well as certain other hazardous environments. In accordance with the Draft Guidelines for Accessible Public Rights-of-Way, Jun. 14, 2002, "Detectable warnings shall consist of a surface of truncated domes aligned in a square grid pattern . . . " Truncated domes in a detectable warning surface are to have a base diameter of 0.9 in (23 mm) minimum to 1.4 inches (36 mm) maximum, a top diameter of 50% of the base diameter minimum to 65% of the base diameter maximum, and a height of 0.2 in (5 mm). Truncated domes in a detectable warning surface are to have a center-to-center spacing of 1.6 inches (41 mm) minimum and 2.4 inches (61 mm) maximum and a base-to-base spacing of 0.65 inches (16 mm) minimum, measured between the most adjacent domes on square grid. Detectable warning surfaces shall contrast visually with adjoining surfaces, either light-on-dark or dark-on-light. However, such conventional detectable warning surfaces provide no lighting, and also no way to convey messages, such as scrolling sign messages indicating ingress and egress direction, warning, timing (for example, for the next available train), and other information, entertainment or safety lighted indications.

SUMMARY OF THE INVENTION

In accordance with an aspect of the invention, a method provides a strong, durable, waterproof illuminated paver that includes an array of individually addressable light sources, having the aesthetic appearance of a conventional stone material. The method comprises providing a light guide having a light receiving end and a light transmissive end. A light source is provided having a selective on state and a selective off state. The light source is optically coupled to the light receiving end of the light guide to form a light engine comprising the light source and the light guide. The optically coupled light guide and light source are encased within an encapsulating bulk, wherein the encapsulating bulk includes at least one viewable surface, and where the light transmissive end of the light guide is viewable at said at least one viewable surface. An obscuring layer is formed on one or more of the at least one viewable surface for obscuring the transmissive end of the light guide from view when the light source is in the selective off state.

In accordance with another aspect of the invention, an apparatus comprises a strong, durable, waterproof illuminated paver that includes an array of individually addressable light sources, having the aesthetic appearance of a conventional stone material. The apparatus includes a light guide having a light receiving end and a light transmissive end. A light source has a selective on state and a selective off state, wherein the light source is optically coupled to the light receiving end of the light guide to form a light engine comprising the light source and the light guide. An encapsulating bulk encases the optically coupled light guide and light source therewithin. The encapsulating bulk includes at least one viewable surface. The light transmissive end of the light guide is viewable at said at least one viewable surface.

An obscuring layer is provided for obscuring the transmissive end of the light guide from view when the light source is in the selective off state.

In accordance with another aspect of the invention, a solar paver comprises a light guide having a light receiving end and a light transmissive end. A light to energy device is provided, wherein the light to energy device is optically coupled to the light transmissive end of the light guide to form a solar cell comprising the light to energy device and the light guide. An encapsulating bulk encases the optically coupled light guide and light to energy device therewithin. The encapsulating bulk includes at least one light receiving surface. The light receiving end of the light guide is at least one light receiving surface. The light to energy device comprises one or more solar die and the light guide comprises one or more individual lenses having each individual lens associated with a respective solar die and LED.

BRIEF DESCRIPTION OF THE DRAWINGS

FIG. 12 is a flow chart showing a method for making the inventive waterproof, encapsulated lighting source using preformed components;

FIG. 13 is a flow chart showing a method for making the inventive waterproof, encapsulated lighting source using a cast encapsulating bulk such as an epoxy and stone powder mixture;

FIG. 17 is an assembled view of an embodiment of an waterproof, encapsulated lighting source having a heat sink bottom, machined stone encapsulating bulk and an obscuring layer for obscuring the transmissive end of the light guide from view when the light source is in the selective off state;

FIG. 18 is an assembled view showing a preassembled light guide and LED PCB board mounted in a heat sink bottom, and a machined stone encapsulating bulk;

FIG. 19 is a cross sectional exploded view of an embodiment of the inventive waterproof, encapsulated lighting source with a machined stone encapsulating bulk, epoxy encapsulating bottom, and cast-in-place light guides;

FIG. 20 is a cross sectional exploded view of an embodiment of the inventive waterproof, encapsulated lighting source showing a cone shaped light guide array preformed and encapsulating the LED PCB with a machined or cast-in-place encapsulating bulk;

FIG. 21 is cross sectional exploded view of an embodiment of the inventive waterproof, encapsulated lighting source having preformed or cast in place cone shaped light guides and a pre-encapsulated LED PCB;

FIG. 22 is an isolated view of an SMT LED having an optically coupled fiber optic light guide;

FIG. 23 is a cross sectional view of the embodiment of the inventive waterproof, encapsulated lighting source having SMT LEDs with outboard edge fiber optic light guides showing edge to edge tiling of two waterproof, encapsulated lighting sources maintaining consistent spacing among the light emitting transmissive ends of the light guides among the pavers;

FIG. 28 is a perspective view of another aspect of the present invention showing an individual lens associated with a respective solar die and LED;

FIG. 29 is a side view of the individual lens of the inventive solar paver, showing a ray diagram schematically indicating various angles of incidence of sunlight at the top exposed relatively larger hemispherical lens surface and exiting from a relatively smaller hemispherical lens surfaces that the individual lens has a focal point near the respective solar die and/or LED(s);

FIG. 30 is an isolated perspective view of an array of lenses each associated with a respective solar die and/or LED(s);

FIG. 40 shows six 12"×12" LED PCBs having different lengths of light guides to form a 3D waterproof, encapsulated lighting source surface;

FIG. 41 is an isolated view of one of the 12"×12" LED PCBs showing the different lengths of light guides;

FIG. 42 is a cross sectional view showing a waterproof, encapsulated lighting source configured as a speed bump;

FIG. 43 is a perspective view of the waterproof, encapsulated lighting source configured as a speed bump having six 12"×12" LED PCBs having different lengths of light guides to form a 3D waterproof, encapsulated lighting source surface;

FIG. 44 is a photo showing an assembled experimental prototype waterproof, encapsulated lighting source having a transparent hard coating covering the light emissive surface;

FIG. 45 is a photo showing the experimental prototype waterproof, encapsulated lighting source with light emitting from the viewable surface;

FIG. 46 is a photo showing the experimental prototype waterproof, encapsulated lighting source having the obscuring layer for obscuring the transmissive end of the light guide from view when the light source is in the selective off state;

FIG. 47 is a photo showing the experimental prototype Light Guide and Frame assembly;

FIG. 48 is a photo showing the machined soapstone scaffold of an experimental prototype waterproof, encapsulated lighting source;

FIG. 49 is a photo showing the assembled experimental prototype waterproof, encapsulated lighting source having the transparent hard coating covering the light emissive surface;

FIG. 50 is a photo showing four experimental prototype waterproof, encapsulated lighting sources assembled on a common substrate;

FIG. 51 is a photo showing the four experimental prototype waterproof, encapsulated lighting sources assembled on the common substrate having some of the light sources lit up;

DETAILED DESCRIPTION OF THE INVENTION

Figure 1:
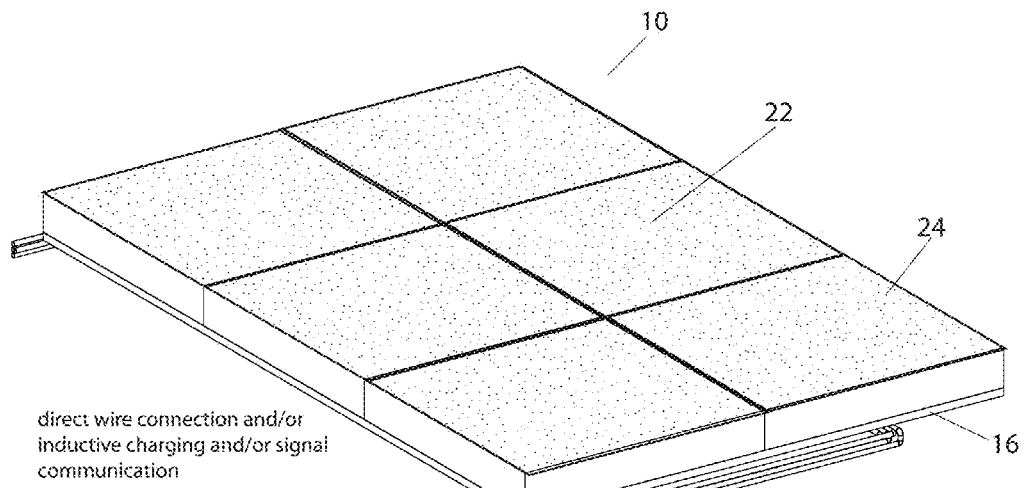
FIG. 1 shows a section of an assembled pathway constructed using the inventive waterproof, encapsulated lighting sources.
Figure 2:
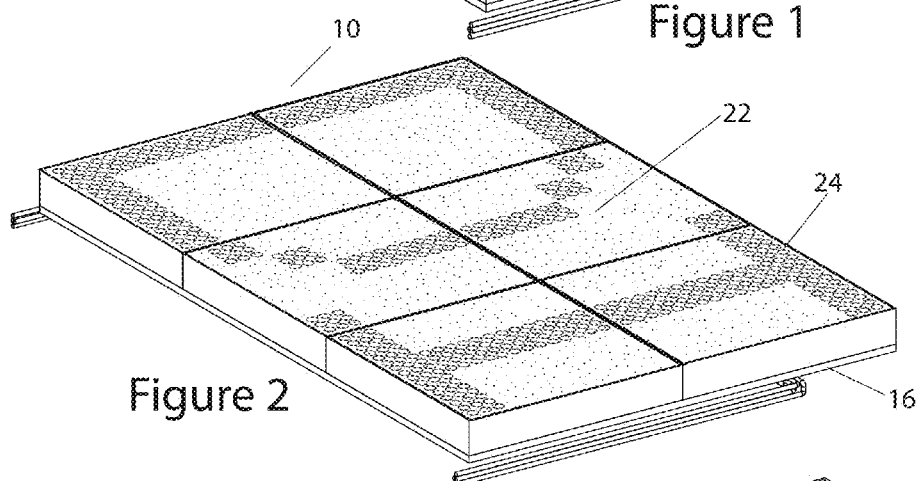
FIG. 2 shows the section of the assembled pathway constructed using the inventive LED pavers, showing a scrolling message being displayed on a three by two grid of the inventive waterproof, encapsulated lighting sources.
Figure 3:
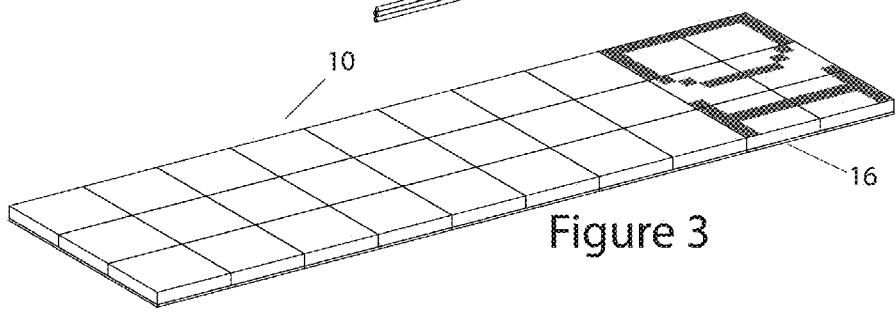
FIG. 3 shows a larger section of the assembled pathway show in FIG. 2, showing the inventive waterproof, encapsulated lighting sources mounted on an installation-facilitating backerboard.

FIG. 1 shows a section of an assembled pathway 12 constructed using the inventive waterproof, encapsulated lighting sources 10. FIG. 2 shows the section of the assembled pathway 12 constructed using the inventive waterproof, encapsulated lighting sources 10, showing a scrolling message being displayed on individually addressable light sources 14 of a three by two grid of the inventive waterproof, encapsulated lighting sources 10. FIG. 3 shows a larger section of the assembled pathway 12 show in FIG. 2, showing the inventive waterproof, encapsulated lighting sources 10 mounted on an installation-facilitating backer board 16. In accordance with an aspect of the invention, an apparatus comprises a light guide 18 having a light receiving end and a light transmissive end. A light source 14 has a selective on state and a selective off state, wherein the light source 14 is optically coupled to the light receiving end of the light guide 18 to form a light engine comprising the light source 14 and the light guide. An encapsulating bulk 20 encases the optically coupled light guide 18 and light source 14 therewithin. The encapsulating bulk 20 includes at least one viewable surface 22. The light transmissive end of the light guide 18 is viewable at said at least one viewable surface 22. An obscuring layer 24 is provided for obscuring the transmissive end of the light guide 18 from view when the light source 14 is in the selective off state.

The encapsulating bulk 20 is preferably formed so that the light engine is encased within the encapsulating bulk 20 without an air gap or air filled cavity. That is, the encapsulating bulk 20 completely surrounds and encases the light engine so that a vertical load on the viewable surface 22 is supported without flexure that may be caused if there is an air gap or air filled cavity. In a non-limiting, exemplary embodiment, the encapsulating bulk 20 is formed from a cast-in-place hardened medium that is able to flow around and fill spaces within and between the components that make up the light engine, and flow around and encase wires that bring power and signals from an external source to the light engine. In another non-limiting, exemplary embodiment, the encapsulating bulk 20 is a preformed and includes a pocket for receiving the light engine and acts as a scaffold that supports and defines cast-in-place or otherwise formed structures such as light guides 18 and barrier materials disposed into the pocket. For example, the encapsulating bulk 20 can be formed by machining a natural stone material, such as soap stone, to provide the scaffold. Unlike many other natural stone materials, soap stone is a natural stone that provides very good barrier properties to prevent the ingress of water. To further prevent the electronic components from being exposed to moisture, a hardneable, waterproof material, such as epoxy or polyurethane can be used to coat the electronic components prior to, or after, the electronic components are inserted into the scaffold. The scaffold can also be formed by injection molding or casting other materials, such as plastic or concrete, or a composite of an epoxy or polyurethane mixed with other materials, such as stone powder, motor, fibers, oxygen and moisture getters.

In some of the non-limiting, exemplary embodiments shown herein, the invention is configured as a pathway 12 paver 10. However, the invention may be configured for many other useful applications, including, but not limited to, speed bumps, kinetic art, replication of natural objects, such as tree limbs, bushes, sandy beach, grassy field. The invention has applications including wall facades and structural elements, roadway signage and lane dividers, fountains, message board sidewalks and roadways, dance floors, emergency egress notification, advertisement and entertainment uses, and the like.

Figure 4:
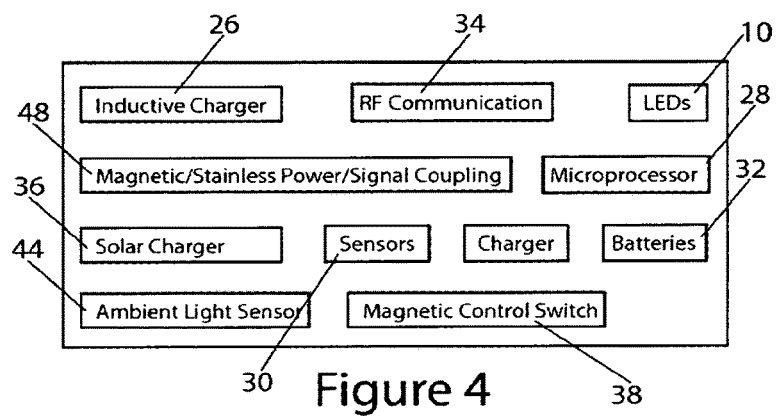
FIG. 4 is a block diagram showing elements of a self-contained version of the inventive waterproof, encapsulated lighting source having, among other things, non-contact electrical charging mechanisms, on-board microprocessing, sensors, energy storage and wireless communication.
Figure 5:
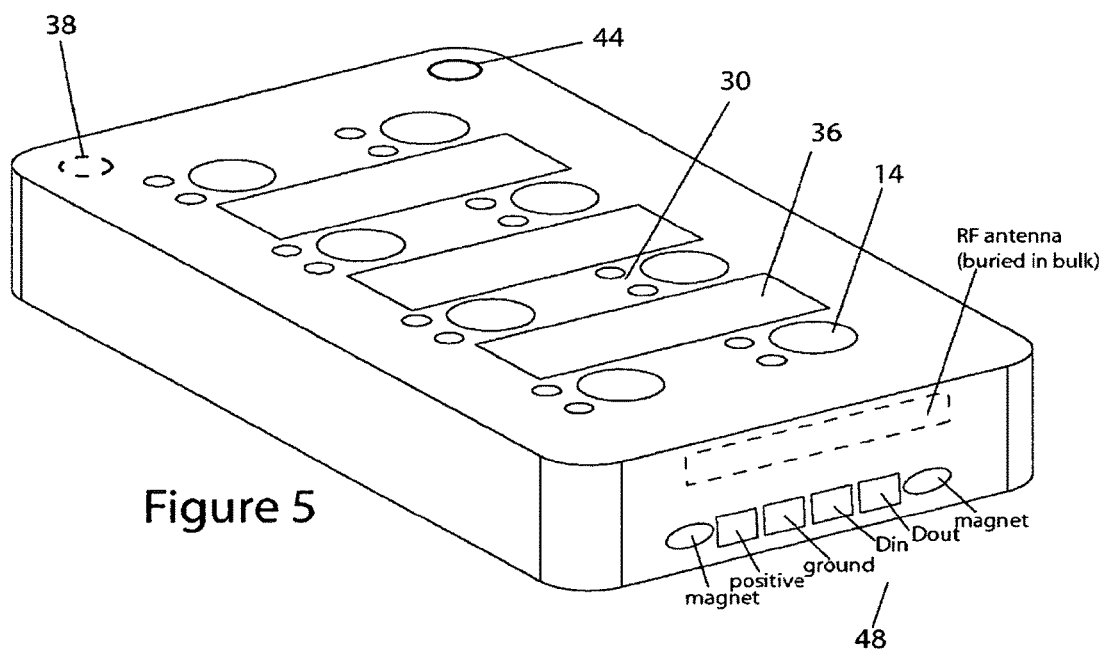
FIG. 5 is a perspective view of a self-contained version of the inventive waterproof, encapsulated lighting source showing, among other things, solar cells, encapsulated magnetically control switch, embedded RF antenna and effect-controlling proximity sensors.

FIG. 4 is a block diagram showing elements of a self-contained version of the inventive waterproof, encapsulated lighting source 10 having, among other things, non-contact electrical charging mechanisms, such as an inductive charging system 26, on-board micro-processing, sensors, energy storage 32 and wireless communication 34. FIG. 5 is a perspective view of a self-contained version of the inventive waterproof, encapsulated lighting source 10 showing, among other things, solar cells, encapsulated magnetic control switch 38, embedded RF antenna 40 and effect-controlling proximity sensors. A control circuit 42 may be provided for controlling the selective on state and the selective off state of the light source. The control circuit 42 may include at least one of an ambient light detector 44, a proximity sensor, an inductive charger, RF transceiver 46, an exposed stainless steel electrical coupling 48, a solar charging circuit, a magnetic control switch 38 and a microprocessor 28. The RF transceiver 46 enables communication between the waterproof, encapsulated lighting source 10 and other devices, such as other waterproof, encapsulated lighting sources 10, computers, smart phones, etc. The RF communication allows a first waterproof, encapsulated lighting source 10 to control the light effects and programming of other waterproof, encapsulated lighting sources 10. For example, if an array of waterproof, encapsulated lighting sources 10 are disposed in a pathway 12, the proximity of a moving object, such as a person, animal or vehicle, can be sensed at a first waterproof, encapsulated lighting source 10, and based on that sensing, an RF signal can be transmitted to other waterproof, encapsulated lighting sources 10 in the array. The transmission can be direct from the first waterproof, encapsulated lighting source 10 and/or can be cascaded among previous and subsequent pavers 10 that receive the RF signal. In this case, the waterproof, encapsulated lighting sources 10 in the array can act as repeaters to trigger a lighting effect at a distant paver 10 that may be out of direct RF signal communication with the first or other previous waterproof, encapsulated lighting source 10.

The RF signaling between pavers 10 enables grid of pavers 10 to be driven in synchronicity. Alternative or in addition to solar, inductive charging can be used to charge the internal batteries 32 during the day (or off period) so that power is available during the evening (or on period). If inductive power is sufficient, internal batteries 32 may not be needed. The inductive coupling can also be used to transmit the control signals. Sensors sense motion, proximity, etc. and produce a sensed signal. By detecting the timing of sensed signal among the sensors, the speed and direction of movement can be determined by microprocessor 28 and can be used for example, to extrapolate trajectory of a virtual kick of a ball. The neighboring pavers 10 receive a signal via the RF communication to create a visual representation of the virtual ball's motion. Solar panels can also act as light sensitive sensors. RF communications can be used to set programming of all the pavers 10 so that different actions can occur among the grid of pavers 10 in response to sensed motion at any of the pavers 10. In a power savings mode, a light detector 44 is used to control the turning on and/or brightness of the light sources 14 depending on ambient light. A timer can be provided to turn off when not needed (after facility closing hours, etc.) Pulse-width modulation of sensor 30 IR emitter/detector pair can be employed, for example a hibernation mode puts sensors 30 into 10% duty cycle, 1 pulse per second for $\frac{1}{10}$th second, then, when one sensor 30 detects proximity, turn all sensor 30 on to full duty cycle until no proximity detected on any sensor 30 for 3 seconds, then back to hibernation mode. When a paver 10 detects proximity, neighboring pavers 10 can be turned on via an RF signal to full duty cycle.

Figure 6:
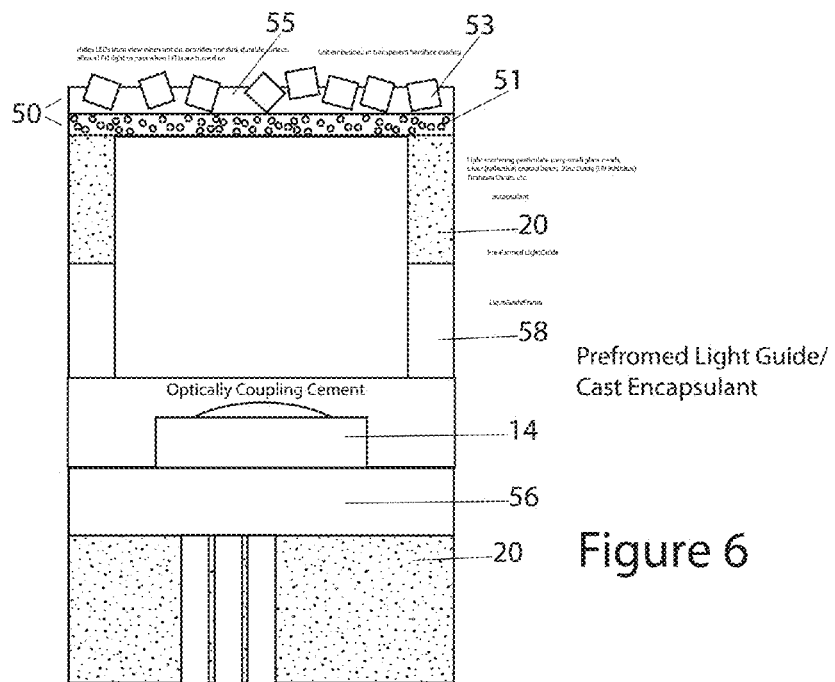
FIG. 6 is an isolated cross section showing an LED light source and optically coupled preformed light guide encased within a cast or molded encapsulating bulk and having an obscuring layer.
Figure 7:
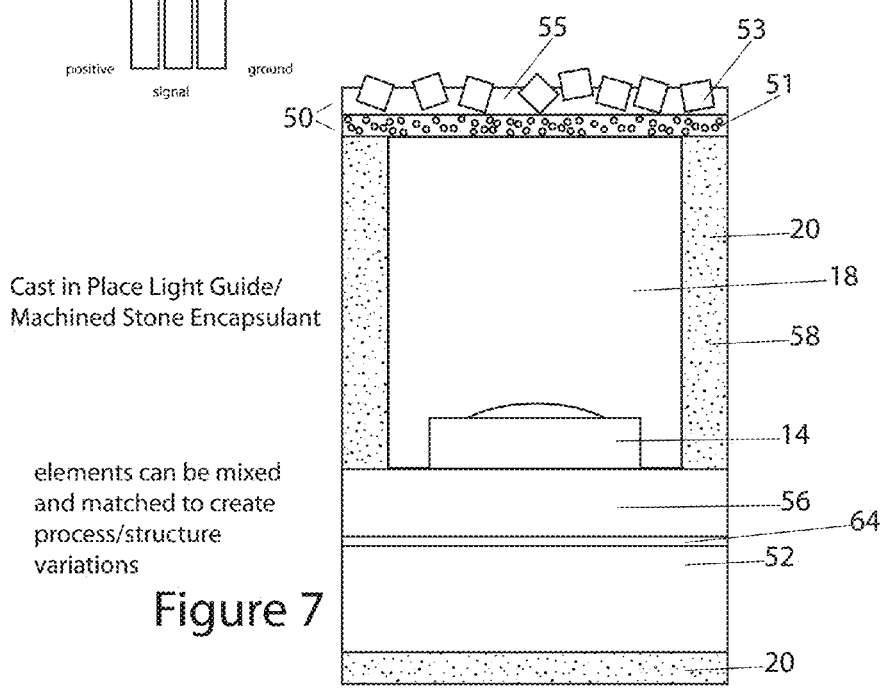
FIG. 7 is an isolated cross section showing an LED light source and optically coupled cast-in-place light guide encased within machined stone encapsulating bulk and having an obscuring layer.

FIG. 6 is an isolated cross section showing an LED light source 14 and optically coupled preformed light guide 18 encased within a cast or molded encapsulating bulk 20 and having an obscuring layer 24. FIG. 7 is an isolated cross section showing an LED light source 14 and optically coupled cast-in-place light guide 18 encased within machined stone encapsulating bulk 20 and having an obscuring layer 24. The obscuring layer 24 may comprise a light transmissive coating 50 disposed on said at least one viewable surface 22 and providing a view obscuring structure in the light transmissive coating 50. The view obscuring structure may comprise at least one of grit particles 53 fixed in the transmissive coating 50 extending from a viewable surface 22 of the light transmissive coating 50 and effective for providing a slip resistant surface, a light reflective or scattering particulate 51 dispersed within the light transmissive coating 50, and a texture formed in the light transmissive coating 50.

Figure 8:
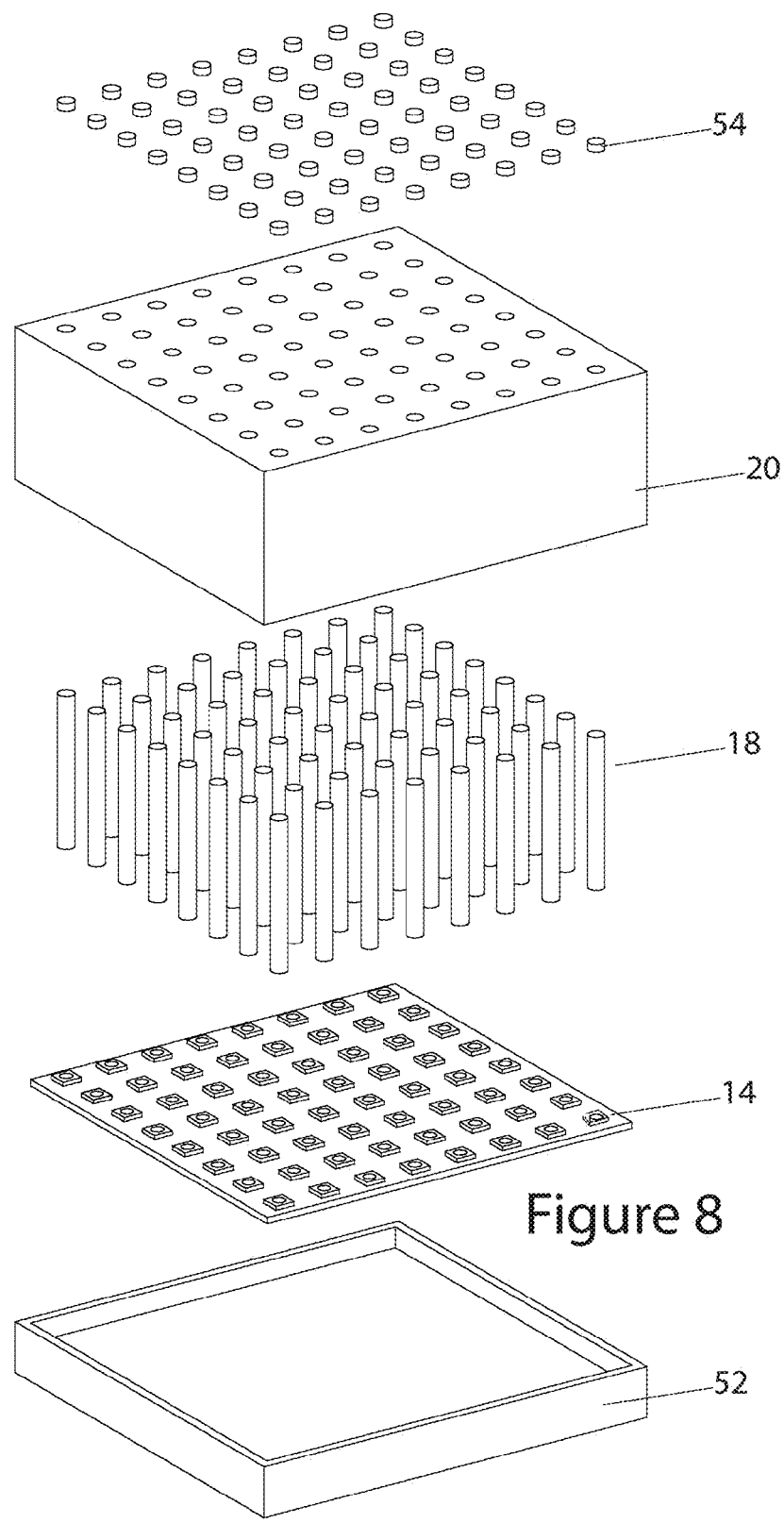
FIG. 8 is an exploded view showing components of an embodiment of the inventive waterproof, encapsulated lighting source including a heat sink bottom and obscuring caps.

FIG. 8 is an exploded view showing components of an embodiment of the inventive waterproof, encapsulated lighting source 10 including a heat sink 52 bottom and obscuring caps 54. In this non-limiting exemplary embodiment, a thermally conductive member may be thermally coupled with the light source 14 to remove heat from the light source. An aluminum base can include a well that holds the printed circuit board containing the LED array. A suitable insulator to prevent short circuits can be used to fix the printed circuit board to the bottom of the well in the aluminum base.

Figure 9:
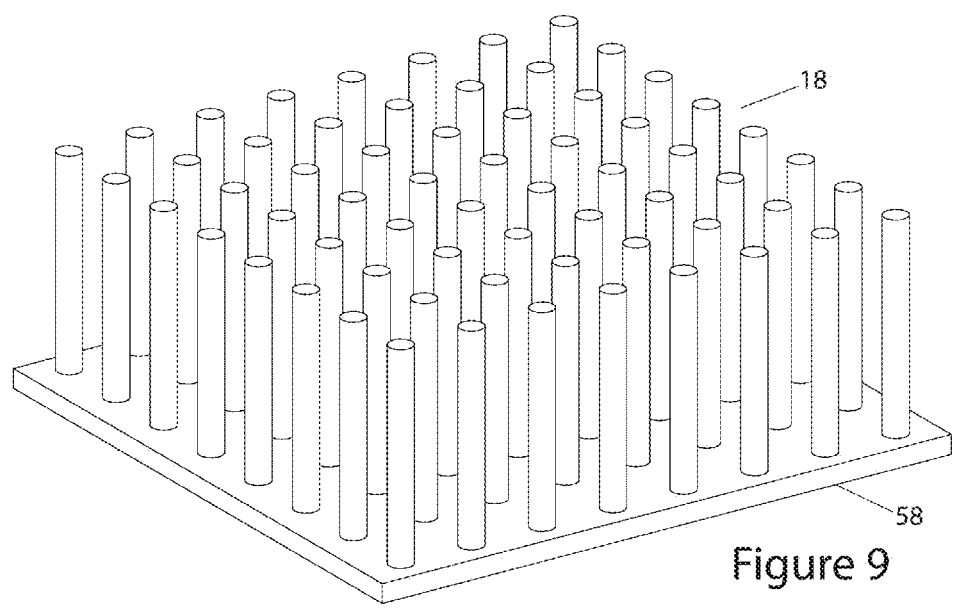
FIG. 9 is an isolated view of a light guide assembly including optically transmissive light guides mounted on an opaque frame.
Figure 10:
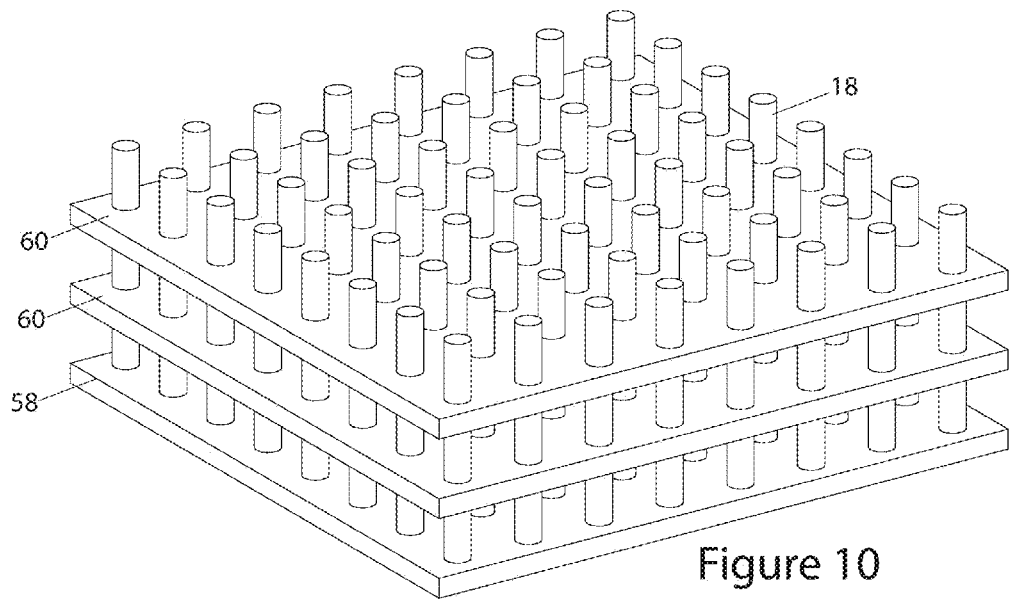
FIG. 10 is an isolated view of a light guide assembly including optically transmissive light guides mounted on a light transmissive frame, having one or more light guide light extractors.

FIG. 9 is an isolated view of a light guide 18 assembly including optically transmissive light guides 18 mounted on an opaque frame 58. The light guide 18 may a light guide 18 assembly including a plurality of light guide 18 units, each light guide 18 unit being associated with an individual light source. FIG. 10 is an isolated view of a light guide 18 assembly including optically transmissive light guides 18 mounted on a light transmissive frame 58, having one or more light guide 18 light extractors 60. The light guide frame 58 may be opaque if it is desired to have good contrast (light/dark) between the pixels formed at the viewable surface 22. The opaque light guide frame 58 prevents light from the LEDs from leaking to the light guide 18 of a neighboring LED. Alternatively, if the light guide frame 58 allows for light transmission, interesting light and shadow effects can be produced where the light emitted from an LED leaks to and is carried to the surface of the waterproof, encapsulated lighting source 10 by a light guide 18 of a neighboring LED. A feature similar to the light guide frame 58, a light guide light extractor 60, can be provided higher up on the light guide 18 array so that light from the LEDs can be extracted at the sides of the waterproof, encapsulated lighting source 10 in addition to, or instead of, at the surface of the waterproof, encapsulated lighting source 10. In this case, the edges of the light guide 18 light extractor are exposed at the sides of the waterproof, encapsulated lighting source 10, and a band of light is emitted and viewable from the edges of the light guide light extractor 60. Also, rather than being flush at the surface of the waterproof, encapsulated lighting source 10, the ends of the light guides 18 can protrude from the surface of the waterproof, encapsulated lighting source 10 and provide for light extraction at the exposed surfaces of the light guides. In an alternative construction, the ends of the light guides 18 can be encapsulated within a translucent material that extends off the top surface of the paver 10 encapsulating bulk 20. In accordance with this alternative embodiment, the translucent material diffuses the light from the ends of the light guides 18 to create a glowing light structure at the top of the waterproof, encapsulated lighting source 10. The translucent material can include light diffusing particulate 51, UV inhibitors, etc., and the cross section end surface of the light guides 18 can be reflective to the light that travels up the light guide 18 to encourage light extraction out of the sides of the light guide 18 within the translucent material to better diffuse the light and make a more uniform color mix and glow.

Figure 11:
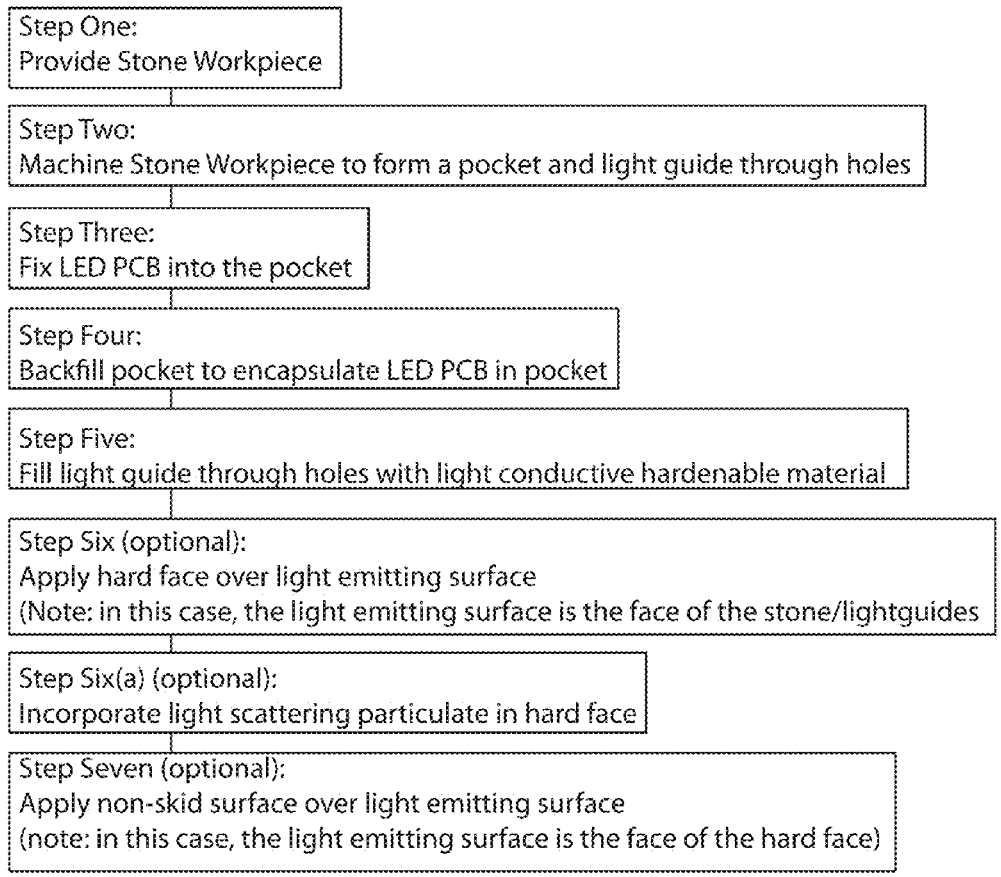
FIG. 11 is a flow chart showing a method for making the inventive waterproof, encapsulated lighting source using a preformed encapsulating bulk such as machined soapstone.

FIG. 11 is a flow chart showing a method for making the inventive waterproof, encapsulated lighting source 10 using a preformed encapsulating bulk 20 such as machined soapstone. Step One: Provide Stone Workpiece; Step Two: Machine Stone Workpiece to form a pocket and light guide 18 through holes; Step Three: Fix LED PCB 56 into the pocket; Step Four: Backfill pocket to encapsulate LED PCB 56 in pocket; Step Five: Fill light guide 18 through holes with light conductive hardenable material; Step Six (optional): Apply hard face 55 over light emitting surface (note: in this case, the light emitting surface is the face of the stone/light guides); Step Six(a) (optional): Incorporate light scattering particulate 51 in hard face 55; Step Seven (optional): Apply non-skid surface over light emitting surface (note: in this case, the light emitting surface is the face of the hard face 55).

FIG. 12 is a flow chart showing a method for making the inventive waterproof, encapsulated lighting source 10 using preformed components. At least a portion of the encapsulation bulk 20 and light guides 18 may be formed by insert-molding a printed circuit board in a mold cavity with a light transmissive plastic injected into mold cavity to form the light guides 18 and encapsulating the printed circuit board. At least a portion of the encapsulation bulk and the light guides may be formed by insert molding a printed circuit board having an array of individually controllable light emitting diodes in a mold cavity with a light transmissive plastic injected into mold cavity to form the light guides and encapsulating the at least a portion of the printed circuit board and the light emitting diodes. Step One: Provide Substrate Scaffold With Pocket; Step Two: Provide Light guide Assembly; Step Three (a): Fix Light guide Assembly to LED PCB 56 or Substrate Scaffold with Pocket; Step Three (b): Fix Light guide Assembly to Substrate Scaffold with Pocket; Step Four: Encapsulate Light guide Assembly/LED PCB 56 in encapsulating medium (encapsulation of either Assembly of Step 3(a) or 3(b)); Step Five (optional): Machine away excess hardened encapsulting medium to expose light guides 18 light emitting ends; Step Six (optional): Apply hard face 55 over light emitting surface (note: in this case, the light emitting surface is the face of the stone/light guides; Step Six(a) (optional): Incorporate light scattering particulate 51 in hard face 55; Step Seven (optional): Apply non-skid surface over light emitting surface (note: in this case, the light emitting surface is the face of the hard face 55).

FIG. 13 is a flow chart showing a method for making the inventive waterproof, encapsulated lighting source 10 using a cast encapsulating bulk 20 such as an epoxy and stone powder mixture. The encapsulating bulk 20 may comprise a binder and at least one of a natural stone powder, a hydraulic mortar mix, an aggregate, a colorant, a moisture getter, a structural enhancing fiber, a light blocking material, a UV inhibitor, and a light diffusing material. The encapsulating bulk 20 may further include an aggregate, and the aggregate may include relatively finer grain particulate and a relatively larger grained particulate. The binder may be at least one of an epoxy, thermoset plastic, thermoformed plastic, a polyurethane, and a mortar. The encapsulating bulk 20 can be provided through injection or pouring of the encapsulating bulk 20 material around the light engine. Step One: Provide Light guide Assembly; Step One(a): Light guide Assembly can be formed as a one-piece injection molded unit; Step One(b) Light guide can be formed as a two piece insert molded unit. At least a portion of the encapsulation bulk and the light guides are formed by insert molding a printed circuit board having an array of individually controllable light emitting diodes in a mold cavity with a light transmissive plastic injected into mold cavity to form the light guides and encapsulating the at least a portion of the printed circuit board and the light emitting diodes; Step One(c): Light guide can be formed as a two piece frame 58 and individual light guide 18 elements; Step Two: Fix Light guide Assembly to LED PCB 56; Step Three: Encapsulate Light guide Assembly/LED PCB 56 in encapsulating medium; Step Five (optional): Apply hard face 55 over light emitting surface (note: in this case, the light emitting surface is the face of the stone/light guides); Step Five(a) (optional): Incorporate light scattering particulate 51 in hard face 55; Step Four (optional): Machine away excess hardened encapsulating medium to expose light guides 18 light emitting ends; Step Six (optional): Apply non-skid surface over light emitting surface (note: in this case, the light emitting surface is the face of the hard face 55).

As described above with reference to the flow charts in FIGS. 11-13, in accordance with the inventive method, a light guide 18 is provided having a light receiving end and a light transmissive end. A light source 14 is provided having a selective on state and a selective off state. The light source 14 is optically coupled to the light receiving end of the light guide 18 to form a light engine comprising the light source 14 and the light guide. The light source 14 may comprise an array of individually addressable light source 14 including a light emitting diode, filament bulb and electroluminescent light devices, and the light guide 18 comprises a light guide 18 assembly including a plurality of light guide 18 units, each light guide 18 unit being associated with a respective said individual addressable light source. The optically coupled light guide 18 and light source 14 are encased within an encapsulating bulk 20, wherein the encapsulating bulk 20 includes at least one viewable surface 22, and where the light transmissive end of the light guide 18 is viewable at said at least one viewable surface 22. An obscuring layer 24 is formed on one or more of the at least one viewable surface 22 for obscuring the transmissive end of the light guide 18 from view when the light source 14 is in the selective off state.

Figure 14:
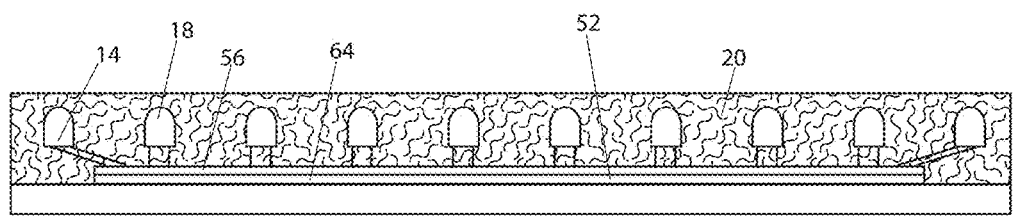
FIG. 14 is a cross sectional view of an embodiment of the inventive waterproof, encapsulated lighting source having through-hole mounted LEDs with outboard edge LEDs to enable edge to edge tiling of waterproof, encapsulated lighting sources while maintaining consistent LED spacing among the pavers.
Figure 15:
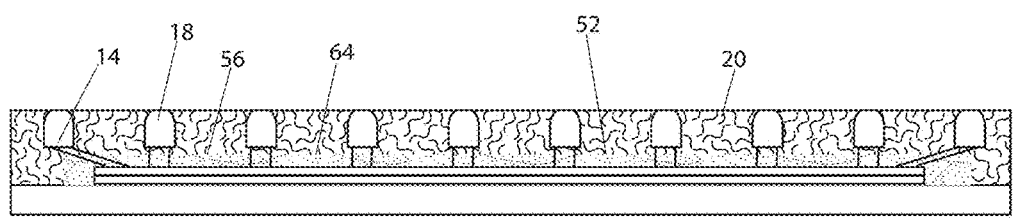
FIG. 15 is a cross sectional view of an embodiment of the inventive waterproof, encapsulated lighting source having an internal encapsulation around the LED PCB.
Figure 16:
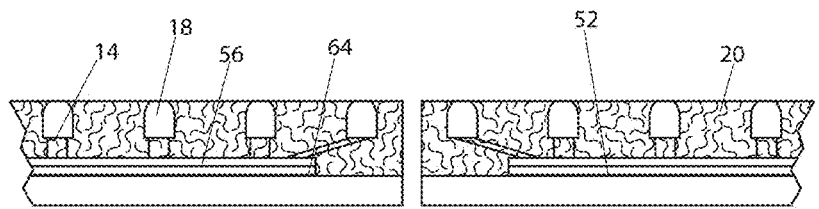
FIG. 16 is a cross sectional view of the embodiment of the inventive waterproof, encapsulated lighting source having through-hole mounted LEDs with outboard edge LEDs showing edge to edge tiling of two waterproof, encapsulated lighting sources maintaining consistent LED spacing among the pavers.

FIG. 14 is a cross sectional view of an embodiment of the inventive waterproof, encapsulated lighting source 10 having a light source 14 comprised of through-hole mounted LEDs with outboard edge LEDs to enable edge to edge tiling of waterproof, encapsulated lighting sources 10 while maintaining consistent LED spacing among the pavers 10. FIG. 15 is a cross sectional view of an embodiment of the inventive waterproof, encapsulated lighting source 10 having an internal encapsulation around the LED PCB 56. FIG. 16 is a cross sectional view of the embodiment of the inventive waterproof, encapsulated lighting source 10 having through-hole mounted LEDs with outboard edge LEDs showing edge to edge tiling of two waterproof, encapsulated lighting sources 10 maintaining consistent LED spacing among the pavers 10. FIG. 17 is an assembled view of an embodiment of a waterproof, encapsulated lighting source 10 having a heat sink 52 bottom, machined stone encapsulating bulk 20 and an obscuring layer 24 for obscuring the transmissive end of the light guide 18 from view when the light source 14 is in the selective off state. FIG. 18 is an assembled view showing a preassembled light guide 18 and LED PCB 56 board mounted in a heat sink 52 bottom, and a machined stone encapsulating bulk 20. FIG. 19 is a cross sectional exploded view of an embodiment of the inventive waterproof, encapsulated lighting source 10 with a machined stone encapsulating bulk 20, epoxy encapsulating bottom, and cast-in-place light guides. FIG. 20 is a cross sectional exploded view of an embodiment of the inventive waterproof, encapsulated lighting source 10 showing a cone shaped light guide 18 array preformed and encapsulating the LED PCB 56 with a machined or cast-in-place encapsulating bulk 20. FIG. 21 is cross sectional exploded view of an embodiment of the inventive waterproof, encapsulated lighting source 10 having preformed or cast in place cone shaped light guides 18 and a pre-encapsulated LED PCB 56, in this case the pre-encapsulating material 20a could be an optically transparent material, such as an epoxy or polyurethane, that provides the desired barrier and optical properties.

FIG. 22 is an isolated view of a light engine that includes an SMT LED having an optically coupled fiber optic 62 light guide. FIG. 23 is a cross sectional view of the embodiment of the inventive waterproof, encapsulated lighting source 10 having SMT LEDs with outboard edge fiber optic 62 light guides 18 showing edge to edge tiling of two waterproof, encapsulated lighting sources 10 maintaining consistent spacing among the light emitting transmissive ends of the light guides 18 among the pavers 10. Aluminum plate can be used to back the paver 10 for durability and heat dissipation (in this case, when installed for example in a walkway, the AL is in contact with the earth for good heat sink 52ing). The AL could be separate from the PCB 56, and if needed a thermal conductive material (e.g., thermal tape 64) can be used to adhere the PCB 56 to the aluminum. The PCB 56 is fully encapsulated or sealed into machined stone. A fiber optic 62 is optically coupled to LED emitter. The emitter can be a bare die formed in place LED structure or a prepackaged lamp such as a SMT. The fiber optic 62 provides a light guide 18 to the top viewable surface 22 of the paver 10. The fiber optic 62 can have a diameter that makes the exit surface of the fiber optic 62 at the top surface of the paver 10 less visible. The fiber optic 62 can provide a bent pathway 12 for the light emitted by the emitter, enabling multiple light points to be visible at the top surface of the paver 10 with the light source 14 for the multiple light points being the same LED emitter. Also, the bent light guide 18 can enable a uniform LED array to be formed at the top surface of the paver 10 with a non-uniform array of LED emitters on the embedded PCB 56, allowing for the possibility of full encapsulation of the PCB 56 board with a minimum paver 10 boarder for uniform tiling of multiple LED arrays.

Figure 24:
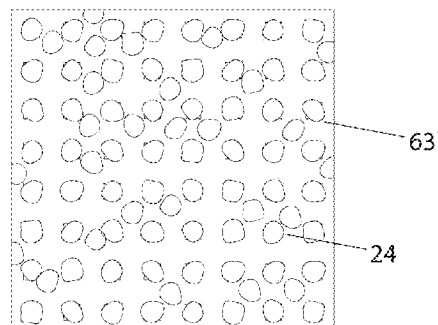
FIG. 24 is a top plan view of an embodiment of the inventive waterproof, encapsulated lighting source having an obscuring layer for obscuring the transmissive end of the light guide from view when the light source is in the selective off state by creating a random or pseudo random pattern of obscuring elements to break up the pattern of the exposed light guide ends when viewed.
Figure 26:
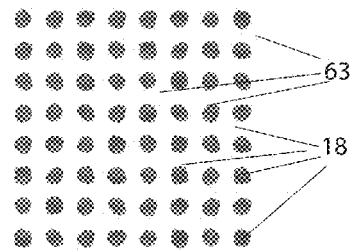
FIG. 26 is a top plan view of an embodiment of the inventive waterproof, encapsulated lighting source the random or pseudo random pattern of obscuring elements to break up the pattern of the exposed light guide ends when viewed, showing the light transmissive caps with the all of the LEDs in the on state.
Figure 25:
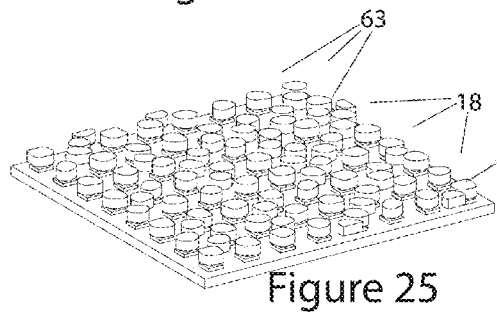
FIG. 25 is a perspective view of the LED PCB having light transmissive caps and obscuring elements fixed to the LED PCB prior to encapsulation.
Figure 27:
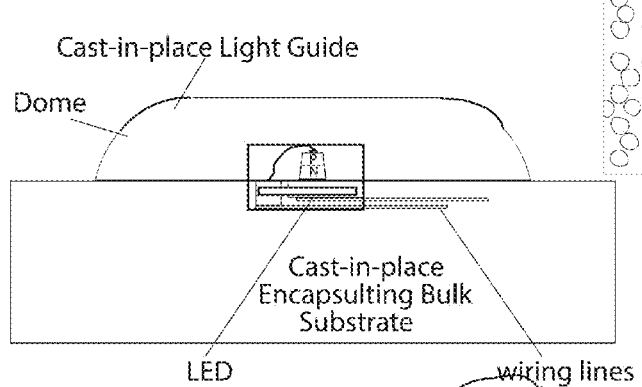
FIG. 27 is a top plan view showing a two by two grid of waterproof, encapsulated lighting sources all having the same pseudo random pattern of obscuring elements, which each waterproof, encapsulated lighting source in the grid rotated relative to the others.

FIG. 24 is a top plan view of an embodiment of the inventive waterproof, encapsulated lighting source 10 having an obscuring layer 24 for obscuring the transmissive end of the light guide 18 from view when the light source 14 is in the selective off state by creating a random or pseudo random pattern of obscuring elements 63 to break up the pattern of the exposed light guide 18 ends when viewed. FIG. 25 is a perspective view of the LED PCB 56 having light transmissive caps and obscuring elements 63 fixed to the LED PCB 56 prior to encapsulation. FIG. 26 is a top plan view of an embodiment of the inventive waterproof, encapsulated lighting source 10 the random or pseudo random pattern of obscuring elements 63 (shown lighter) to break up the pattern of the exposed light guide 18 ends (shown darker) when viewed, showing the light transmissive caps with all of the LEDs in the on state. FIG. 27 is a top plan view showing a two by two grid of waterproof, encapsulated lighting sources 10 all having the same pseudo random pattern of obscuring elements 63, which each waterproof, encapsulated lighting source 10 in the grid rotated relative to the others. A hard face 55 layer may be formed on the viewable surface 22. The viewable surface 22 may include pattern obscuring elements 63 to break up the pattern of the exposed light guide 18 ends when viewed.

Individually placed or injection molded ganged light guide/obscuring elements 63, could be glass or plastic, such as polycarbonate, and disposed slightly raised from viewable surface 22 to provide slip resistance and interesting lighting effects. Cultured stone as the bulk 20 encapsulating material can be cast or molded in a die that has receiving pits that match the contours of the raised light guide/obscuring elements 63 so that the viewable surface 22 includes a smooth cultured stone face having the raised light guide/obscuring elements 63. The cultured stone with the light guide/obscuring elements 63 can be separately formed from the light source 14 structure, then the two components mated together, either with a permanent glue binder, or removably using fasteners and seals.

In accordance with another aspect of the invention, a solar cell 36 configuration is provided having a cone or other advantageously shaped lens 66 that have a relatively wide aperture for receiving sunlight and focus onto a relatively smaller solar die 68. This way, the bulk 20 of the solar cell cost (the cost of the chip) is minimized and the lenses 66 are able to collect maximum sunlight while having the robust structure of the waterproof, encapsulated lighting source 10.

Figure 31:
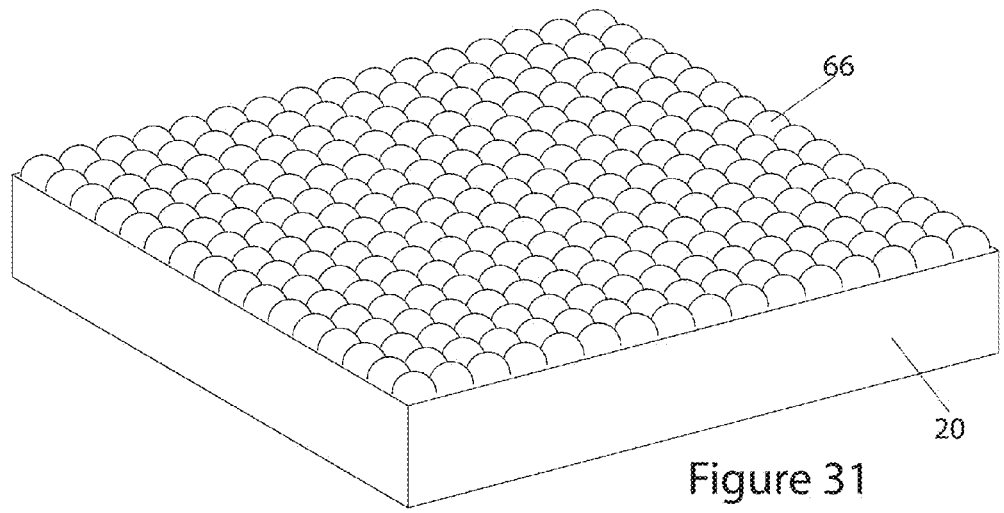
FIG. 31 is a perspective view of an embodiment of the inventive solar paver showing the top exposed relatively larger hemispherical lens surface extending from the top surface of the encapsulating bulk of the inventive solar paver.
Figure 32:
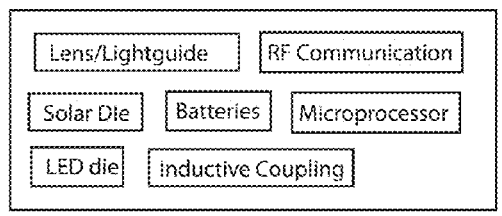
FIG. 32 is a block diagram schematically illustrating the encapsulated components of an embodiment of the inventive solar paver.
Figure 33:
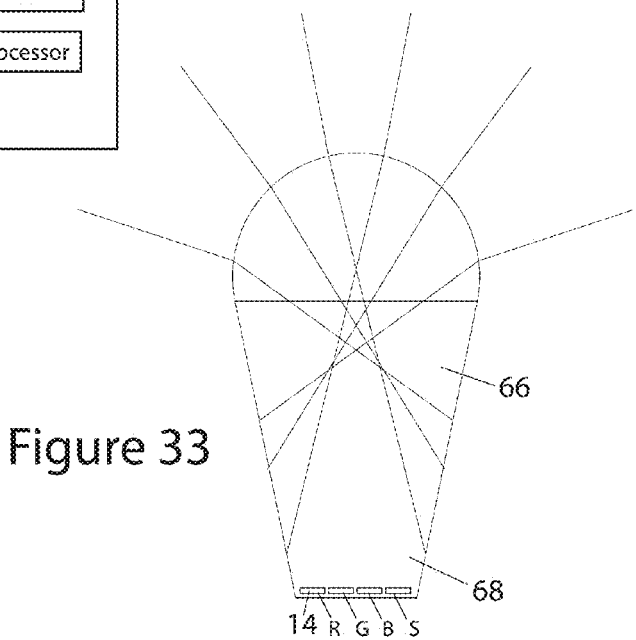
FIG. 33 is a cross sectional view showing an embodiment of the individual lens associated with a respective solar die and/or RGB LED array, with the lens material encapsulating the solar die and LED array so that the lens material performs as a light guide to direct solar energy onto the solar die and to convey light emitted from the LED array.

FIG. 28 is a perspective view of another aspect of the present invention showing an individual lens 66 associated with a respective solar die 68 and LED. FIG. 29 is a side view of the individual lens 66 of the inventive solar paver 10, showing a ray diagram schematically indicating various angles of incidence of sunlight at the top exposed relatively larger hemispherical lens 66 surface and exiting from a relatively smaller hemispherical lens 66 surfaces that the individual lens 66 has a focal point near the respective solar die 68 and/or LED(s). FIG. 30 is an isolated perspective view of an array of lenses 66 each associated with a respective solar die 68 and/or LED(s). FIG. 31 is a perspective view of an embodiment of the inventive solar paver 10 showing the top exposed relatively larger hemispherical lens 66 surface extending from the top surface of the encapsulating bulk 20 of the inventive solar paver 10. FIG. 32 is a block diagram schematically illustrating the encapsulated components of an embodiment of the inventive solar paver 10. FIG. 33 is a cross sectional view showing an embodiment of the individual lens 66 associated with a respective solar die 68 and/or RGB LED array, with the lens 66 material encapsulating the solar die 68 and LED array so that the lens 66 material performs as a light guide 18 to direct solar energy onto the solar die 68 and to convey light emitted from the LED array.

In accordance with another aspect of the invention, a solar paver 10 comprises a light guide 18 having a light receiving end and a light transmissive end. A light to energy device is provided, wherein the light to energy device is optically coupled to the light transmissive end of the light guide 18 to form a solar cell 36 comprising the light to energy device and the light guide. An encapsulating bulk 20 encases the optically coupled light guide 18 and light to energy device therewithin. The encapsulating bulk 20 includes at least one light receiving surface. The light receiving end of the light guide 18 is at least one light receiving surface. The light to energy device comprises one or more solar die 68 and the light guide 18 comprises one or more individual lenses 66 having each individual lens 66 associated with a respective solar die 68 and LED light source 14.

Each individual lens 66 may include a relatively larger hemispherical lens surface disposed at the light receiving end and a relatively smaller hemispherical lens surface disposed at the light transmissive end so that various angles of incidence of sunlight received at the relatively larger hemispherical lens surface exits from a relatively smaller hemispherical lens surface with a focal point near the respective solar die 68 and/or LED light source 14.

An LED die may be associated with at least one of the one or more individual lenses 66, so that the individual lens 66 is associated with both a respective solar die 68 said LED die (light source 14) wherein the individual lens 66 comprise a lens 66 material encapsulating the solar die 68 and an RGB LED array (light source 14), so that the lens 66 material performs as a light guide 18 to direct solar energy onto the solar die 68 and to convey light emitted from the LED die (light source 14).

In accordance with the inventive waterproof, encapsulated lighting source 10, the light source 14 may comprise an array of individually addressable light source 14 including a light emitting diode, filament bulb and electroluminescent light devices, and the light guide 18 comprises a light guide 18 assembly including a plurality of light guide 18 units, each light guide 18 unit being associated with a respective said individual addressable light source.

Figure 34:
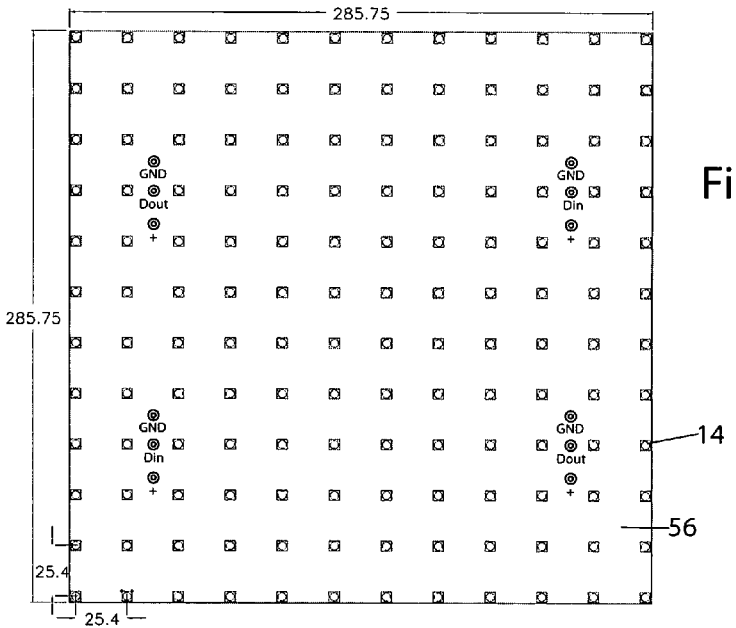
FIG. 34 is a schematic view showing an LED PCB configured and dimensioned to produce a 12"×12" waterproof, encapsulated lighting source.
Figure 35:
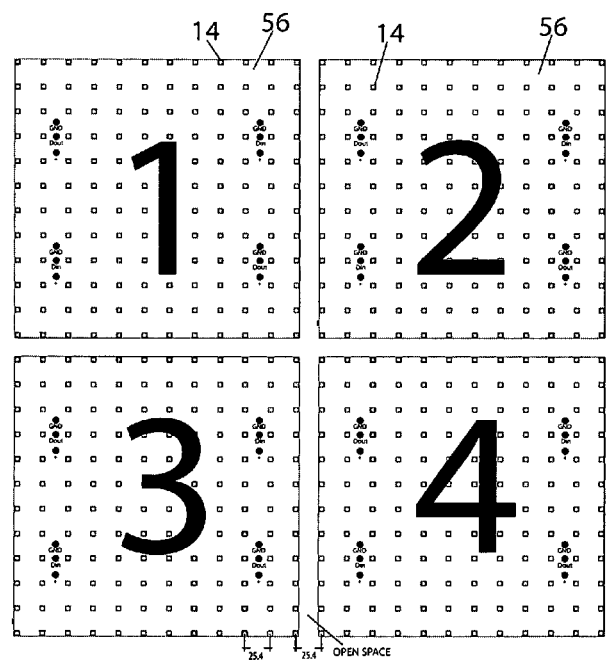
FIG. 35 illustrates the LED PCBs for four waterproof, encapsulated lighting sources showing a gap between the boards to accommodate the waterproof, encapsulated lighting source encapsulation material, and indicating a consistent LED spacing among the LED arrays of the four waterproof, encapsulated lighting sources.

FIG. 34 is a schematic view showing an LED PCB 56 configured and dimensioned to produce a 12"×12" waterproof, encapsulated lighting source 10. FIG. 35 illustrates the LED PCBs 56 for four waterproof, encapsulated lighting sources 10 showing a gap between the boards to accommodate the waterproof, encapsulated lighting source 10 encapsulation material, and indicating a consistent LED spacing among the LED arrays of the four waterproof, encapsulated lighting sources 10. In accordance with this non-limiting, exemplary embodiment, the waterproof, encapsulated lighting source 10 has an array of 144 full color LEDs provided at one inch on center spacing. The one inch on center spacing is maintained between multiple waterproof, encapsulated lighting sources 10 tiled together. The printed circuit board having the LEDs mounted on it is embedded within the encapsulating bulk 20 with sufficient encapsulating material located at the edges of the PCB 56 to maintain a robust and water-tight construction. Because there is an optical gap between the lens 66 surface of the LEDs and the viewable surface 22 of the waterproof, encapsulated lighting source 10, light guides 18 can be configured and dimensioned to expand the emissive surface of light seen at the viewable surface 22. That is, for example, a quarter inch light emissive surface at the lens 66 of the LED can be expended through the appropriately shaped light guide 18 to a three quarter inch light emissive surface at the viewable surface 22 of the waterproof, encapsulated lighting source 10.

Figure 36:
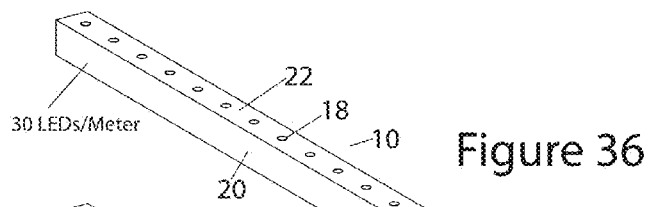
FIG. 36 shows a long, thin waterproof, encapsulated lighting source configuration having 30 LEDs per meter.
Figure 37:
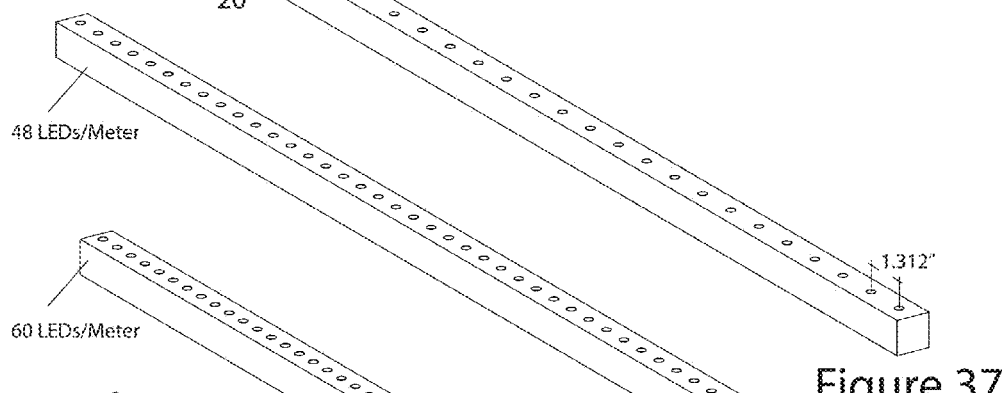
FIG. 37 shows a long, thin waterproof, encapsulated lighting source configuration having 48 LEDs per meter.
Figure 38:
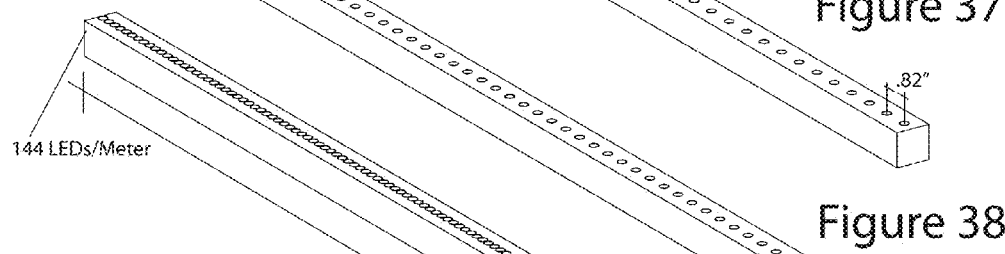
FIG. 38 shows a long, thin waterproof, encapsulated lighting source configuration having 60 LEDs per meter.
Figure 39:
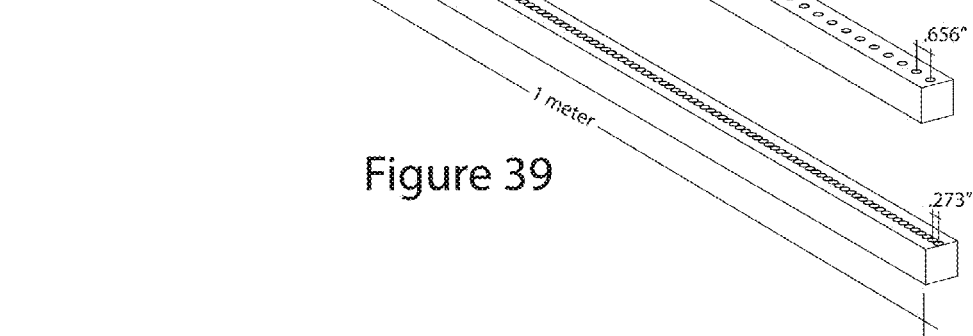
FIG. 39 shows a long, thin waterproof, encapsulated lighting source configuration having 144 LEDs per meter.

FIG. 36 shows a long, thin waterproof, encapsulated lighting source 10 configuration having 30 LEDs per meter. FIG. 37 shows a long, thin waterproof, encapsulated lighting source 10 configuration having 48 LEDs per meter. FIG. 38 shows a long, thin waterproof, encapsulated lighting source 10 configuration having 60 LEDs per meter. FIG. 39 shows a long, thin waterproof, encapsulated lighting source 10 configuration having 144 LEDs per meter. FIG. 40 shows six 12"×12" LED PCBs 56 having different lengths of light guides 18 to form a 3D waterproof, encapsulated lighting source 10 surface.

FIG. 41 is an isolated view of one of the 12"×12" LED PCBs 56 showing the different lengths of light guides. FIG. 42 is a cross sectional view showing a waterproof, encapsulated lighting source 10 configured as a speed bump 70. FIG. 43 is a perspective view of the waterproof, encapsulated lighting source 10 configured as a speed bump 70 having six 12"×12" LED PCBs 56 having different lengths of light guides 18 to form a 3D waterproof, encapsulated lighting source 10 surface. Because the encapsulating material is completely surrounding the internal components (e.g., LED PCB 56, light guides, wires, and other components if present, such as microprocessor 28s, sensors 30 and batteries 32), the waterproof, encapsulated lighting source 10 can withstand high compressive forces such as heavy vehicle traffic and direct compressive loads which would otherwise damage the embedded internal components.

FIG. 44 is a photo showing an assembled experimental prototype waterproof, encapsulated lighting source 10 having a transparent hard coating covering the light emissive surface. FIG. 45 is a photo showing the experimental prototype waterproof, encapsulated lighting source 10 with light emitting from the viewable surface 22. FIG. 46 is a photo showing the experimental prototype waterproof, encapsulated lighting source 10 having the obscuring layer 24 for obscuring the transmissive end of the light guide 18 from view when the light source 14 is in the selective off state. FIG. 47 is a photo showing the experimental prototype Light Guide and Frame 58 assembly. FIG. 48 is a photo showing the machined soapstone scaffold of an experimental prototype waterproof, encapsulated lighting source 10. FIG. 49 is a photo showing the assembled experimental prototype waterproof, encapsulated lighting source 10 having the transparent hard coating covering the light emissive surface. FIG. 50 is a photo showing four experimental prototype waterproof, encapsulated lighting sources 10 assembled on a common substrate. FIG. 51 is a photo showing the four experimental prototype waterproof, encapsulated lighting sources 10 assembled on the common substrate having some of the light sources 14 lit up.

An exemplary formulation of the encapsulating bulk 20 includes a two-part epoxy binder mixed with a colorant, soapstone powder and hydraulic motor mix. An experimental formulation that proved to have a desired flow capability to fully encapsulate the electronic and light guide components without detrimental air entrapment, and that provides superior water barrier, machinability and bonding properties, included a two part long setting epoxy (Easy Cast Clear Casting Epoxy Enamel Resin), soap stone powder (made by machining soap stone using an end mill to create a fine powder), hydraulic mortar mix (Quikrete® Hydraulic Water-Stop Cement). A dry mix was made by combining 2 parts soap stone powder to one part mortar mix. The dry mix was added to a pre stirred epoxy comprised of equal part resin and hardener. The ratio of dry mix to epoxy was 2:1, and the mixture was degassed forming a fluid composite of the epoxy and stone materials. The fluid composite was poured over a light engine that was prefabricated comprising acrylic light guides fixed to an opaque acrylic frame, and the light guide frame assembly was fixed to an LED PCB array using the easy cast clear casting epoxy enamel resin to optically couple the individual light guides to the lens of a respective packaged LED of the LED PCB. The light guide LED PCB assembly was placed in a mold and the fluid composite of the epoxy and stone materials was poured over the assembly with signal and power wires soldered to the PCB with the terminal ends of the wires left out exiting the fluid composite. The mold was then left over night to fully encapsulate and harden. After unmolding, the top surface was machined and sanded to expose the light transmissive ends of the light guides exposed and polished. The top surface was then covered with a hard face of the two part long setting epoxy with silver coated glass beads mixed in as light reflective particulate. A thin coat of the hard face applied to the top surface was allowed to partially harden, and then an aluminum oxide grit was poured over the partially hardened hard face. The hard face is allowed to harden to bond the aluminum oxide grit to the hard face and the excess grit poured off, and the unbounded grit is brushed from the hardened hard face. A thin film of hard face is then applied to the top surface of the bonded grit to fully secure the grit in a hard face coating on the viewable surface of the encapsulated, waterproof light source. The light reflective particulate and the grit in the hard face create an obscuring layer treatment that hides the light transmissive ends of the light guides resulting in, for example, an illuminated paver having an obscuring layer formed on the viewable surface that obscures the transmissive ends of the light guides from view when the LED light source is in the selective off state, and allows light from the light source to be viewable at the viewable surface when the LED light source is in the selective on state.

Other exemplary formulations of the encapsulating bulk 20 include the two-part epoxy binder mixed with at least one of a colorant, soapstone powder, hydraulic motor mix, aluminum oxide grit, glass beads, ground glass, powdered marble, powdered granite, powdered quartz, sand, colored sand, ground walnut shells, marble chunks, soapstone chunks, other stone chunk material, and the like. The light dispersing or reflective particulate that form the obscuring layer can include glass beads, coated glass beads, powdered aluminum, silver or other metal, down converting phosphors (to change the color of the light emitted from the light source), UV inhibitors, and the like. The grit applied to the hard face can include aluminum oxide, ground glass, glass beads, walnut shells, sand blast media, and the like. In some exemplary embodiments the encapsulating bulk 20 disposed nearest to the LED PCB can comprise an optically clear potting material, such as an epoxy or polyurethane, and the encapsulating bulk 20 forming the outer surfaces of the structure, such as a paver, can comprise a cement, or other stone-replicating material. Wood-like appearance can be created by using an encapsulating bulk 20 that replicates a piece of dimensional lumber or natural wood product, such as a tree trunk. Glass or plastic fibers can be included in the encapsulating bulk to provided added strength and durability. The exposed surfaces, such as the viewable surface, may have a texture formed by the mold or formed by a machining, cutting or sanding operation.

Figure 52:
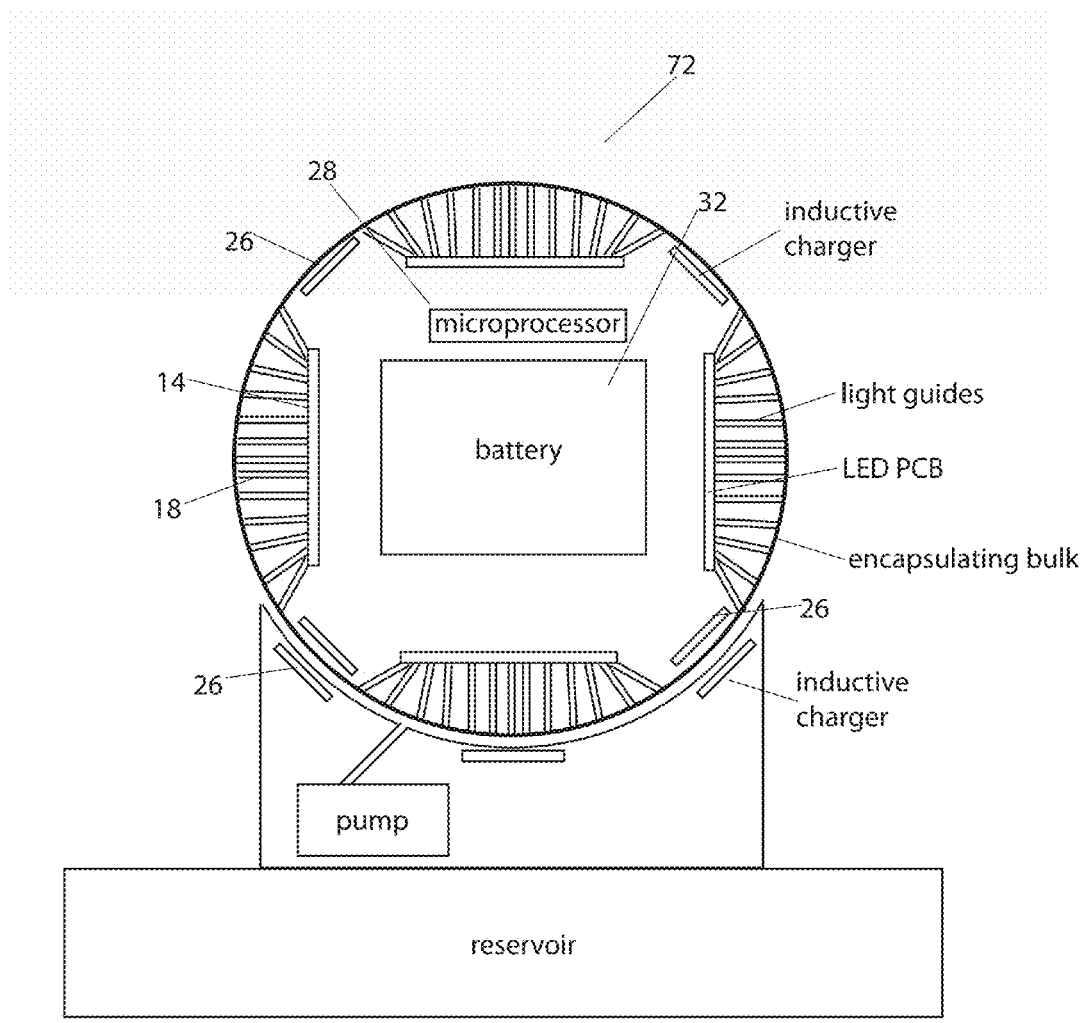
FIG. 52 is a schematic view of a kinetic sculpture having light engines, battery, microprocessor and inductive charging elements embedded within a spherically shape encapsulating bulk.

FIG. 52 is a schematic view of a kinetic sculpture 72 having light engines, battery 32, microprocessor 28 and inductive charging systems 26 embedded within a spherically shape encapsulating bulk 20. In this case, a kinetic sculpture 72, similar to the so-called Kugel ball, can be provided that has light effects without requiring any direct electrical wiring connections to provide signal and power to the embedded light source. The inductive charger 26 can provide power directly to the light sources 14 and other onboard electronics, enabling a non-contact electrical communication between the source of signals and power (for example, the inductive charger 26a can include an inductive electrical source 26 embedded in a water proof mat) and the internal components of the self-contained waterproof, encapsulated lighting source 10 (which can be placed on the inductive mat). The inductive charging system 26 can compliment or be alternative to solar charging and/or batteries 32, that is, the inductive charging system 26 is an non-contact electrical conduit that can be used for charging batteries 32 or providing power directly. Having batteries 32 in combination with an inductive charging system 26 and/or solar allows higher peak watts to be available for driving LEDs, and inductive charger/solar combination ensures that batteries 32 are always fully charged. Inductive charging provides added available watts to combine with charged battery 32 output during LED driving. Software and/or electronic circuit hardware can provide driving scheme that measures available power and sets the peak wattage accordingly to achieve goals, such as minimum on-time (device works as long as theme park stays open at night). Available battery mAHrs plus inductive power supply can be determined so that device brightness is regulated to achieve desired minimum on-time. This way, if for example, if there is a cloudy day or days and the batteries 32 do not get fully charged, for that evening, the maximum brightness can be automatically reduced. The self-contained waterproof, encapsulated lighting source 10 can also receive real time input from via an RF signal to allow the microprocessor 28 to use a weather forecast, for example, to help predict available charge on batteries 32 over a series of days, and automatically adjust light intensity and/or duty cycle and/or on/off time.

Figure 53:
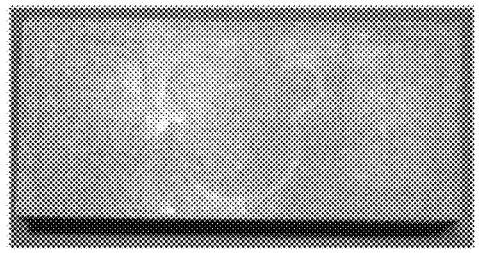
FIG. 53 is a photograph showing an embodiment of an inventive self contained light paver having an obscuring layer.
Figure 54:
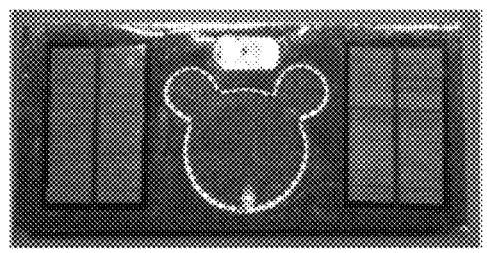
FIG. 54 is a photograph showing an embodiment of the inventive self contained light paver showing solar cells, bluetooth low energy microprocessor circuit and light emitting elements surrounding a light guide.
Figure 55:
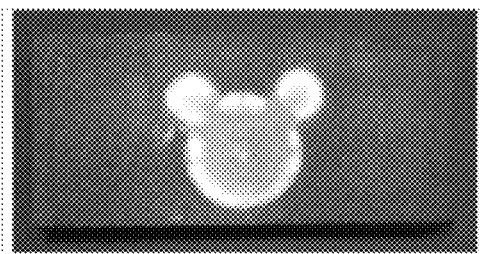
FIG. 55 is a photograph showing the embodiment shown in FIG. 53 with the light emitting elements lit up.
Figure 56:
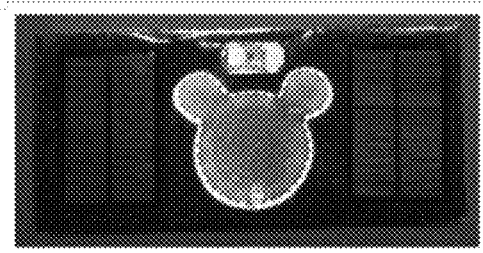
FIG. 56 is a photograph showing the embodiment shown in FIG. 54 with the light emitting elements lit up.
Figure 57:
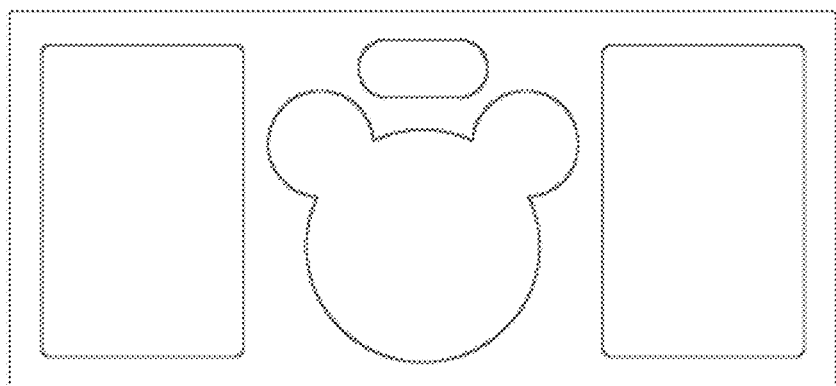
FIG. 57 is a top view of the embodiment of the inventive self contained light paver showing the location of solar cells, bluetooth low energy microprocessor circuit and light emitting elements surrounding a light guide.

FIG. 53 is a photograph showing an embodiment of an inventive self contained light paver having an obscuring layer. FIG. 54 is a photograph showing an embodiment of the inventive self contained light paver showing solar cells, bluetooth low energy microprocessor circuit and light emitting elements surrounding a light guide. FIG. 55 is a photograph showing the embodiment shown in FIG. 53 with the light emitting elements lit up. FIG. 56 is a photograph showing the embodiment shown in FIG. 54 with the light emitting elements lit up. FIG. 57 is a top view of the embodiment of the inventive self contained light paver showing the location at the viewable surface of solar cells, bluetooth low energy microprocessor circuit and light emitting elements surrounding a light guide. Rechargeable lithium batteries and an inductive charging system are disposed below the elements that are in communication with the viewable surface. The inventive structure shown in the exemplary embodiments described herein can be made, for example, by providing a light source embedded in a bulk. The light source comprises at least one light generation element. The bulk may have a viewable surface for viewing the light generated from the light source.

An obscuring layer is formed, for example, by spraying, dip coating, brush coating, pouring, or other layer forming process, on the viewable surface for obscuring the light generation element when light is not being generated. The light generation element may comprise at least one light emitting diode, such as a matrix of light emitting diodes. The matrix of light emitting diodes may be arrange to form a pattern, such as the outline of a optical guide plate (the three conjoined round objects shown in FIGS. 55 and 56), or an x-y grid for forming picture elements of a display or scrolling message board, or a pattern that replicates, for example, constellations of the night sky. The light generation element may comprise a light emitting display comprising for example, one or more display layers formed from a CRT, OLED, LED, LCD, e-paper, or other display layer capable of displaying a video image.

The obscuring layer may be formed by forming a thin layer of a light transmissive adhesive material on the viewable surface. Light obscuring particulate may be adhered to the light transmissive adhesive material so that the light generation element is obscured when the viewable surface is viewed when light is not generated from the light generation element and when light is generated, a portion of the light generated by the light generation element is transmitted from the viewable surface.

For example, a very thin film of clear epoxy is formed on the top surface of the encapsulating bulk/light guides to adhere a fine grit to the viewable surface. If the film is too thick, then too much of the grit gets embedded. For flat versions of the paver, its fairly easy to use a stir stick to squeegee off as much of the epoxy film as possible, but for versions with a relief structure (three D) or bumps on the surface, this becomes more difficult and a dry brush may be used to remove excess epoxy.

Just a small amount of grit material is used to obscure the LEDs so that the finished device looks like a piece of stone or cast cement (that is, until the light source (e.g., LEDs) are turned on). The epoxy may also be thinned by heating or additive so that a very thin film of epoxy can be formed on a sanded smooth surface of the bulk/light guides, then the grit is poured over the coated surface allowing a portion of the grit to become imbedded as the epoxy to harden. After hardening, the excess grit is dumped off and compressed air may be used to blow away any remaining non-bonded grit. A final coat of the epoxy can be applied to lock in the grit. The result is both a slip proof surface and hiding the LEDs from view until they are turned on.

The light transmissive adhesive material may be thus applied as a thin coating, then the light obscuring particulate applied to the thin coating of light transmissive adhesive material. The thin coating of light transmissive material is capable of adhering a small volume of the light obscuring particulate that becomes an adhered portion of the light obscuring particulate. Then the light transmissive adhesive material is allowed to harden, then a non-adhered portion of the light obscuring particulate is removed leaving behind the light transmissive adhesive material having the adhered portion of light obscuring particulate so that the light generation element is obscured when the viewable surface is viewed when light is not generated from the light generation element and when light is generated, a viewable portion of the light generated by the light generation element is transmitted from the viewable surface.

In accordance with another aspect of the invention, a detectable warning surface is provided. The detectable warning surface includes a light source. A bulk encapsulates the light source. The bulk may comprise a substrate having a pattern of raised domes provided on a top surface. The raised domes may act as light guides or may have light guide disposed within the dome. The raised domes may be cast-in-place over at least some components of an electronic circuit, for example, LED packaged lamps or bare die structures may be embedded within pre-formed cast-in-place raised domes. Then, the encapsulating bulk may be formed around the electronic circuit and the domes creating a solid state structure. The the light source is protected by the bulk and light generated by the light source is transmitted from at least one of the top surface of the bulk and the raised domes.

Figure 58:
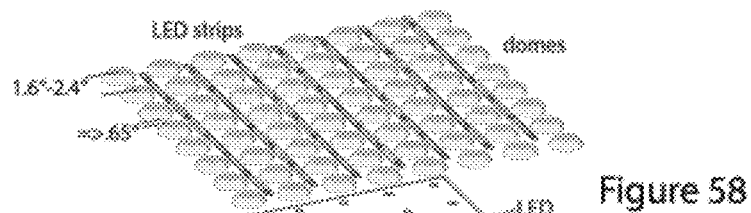
FIG. 58 is an exploded view showing domes and light generation elements of an embodiment of an inventive illuminated detectable warning surface.
Figure 59:
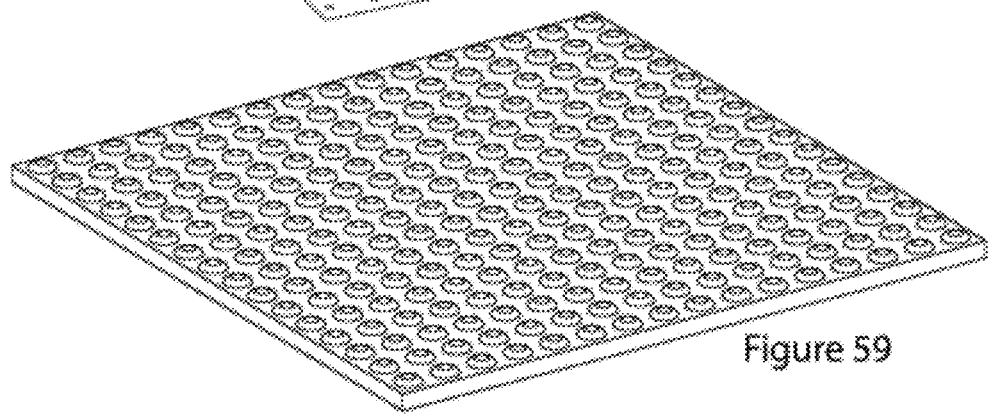
FIG. 59 is a perspective view of a 24"×24" panel unit of the inventive illuminated detectable warning surface.
Figure 60:
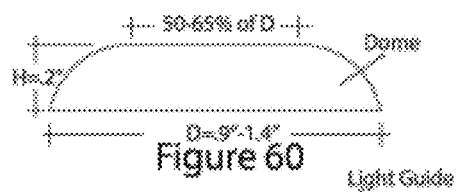
FIG. 60 is a side view of a single dome showing the relative dimensions of the dome in conformance with the guidelines of the American With Disabilities Act.
Figure 61:
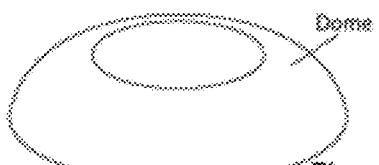
FIG. 61 is a perspective view of the single dome shown in Figure C.
Figure 62:
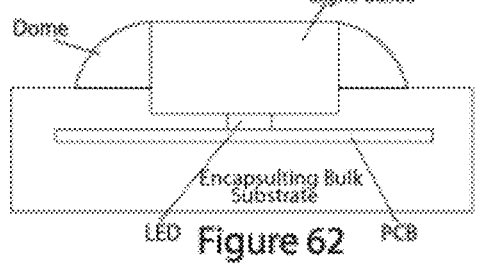
FIG. 62 is a cross section side view showing a single dome of an embodiment of the inventive illuminated detectable warning surface.

An exemplary embodiment of the inventive light emitting detectable warning surface may be formed with features in accordance with the Draft Guidelines for Accessible Public Rights-of-Way, Jun. 14, 2002. The features include a surface of truncated domes aligned in a square grid pattern, where the domes have a base diameter of 0.9 in (23 mm) minimum to 1.4 inches (36 mm) maximum, a top diameter of 50% of the base diameter minimum to 65% of the base diameter maximum, and a height of 0.2 in (5 mm). The domes may have a center-to-center spacing of 1.6 inches (41 mm) minimum and 2.4 inches (61 mm) maximum and a base-to-base spacing of 0.65 inches (16 mm) minimum, measured between the most adjacent domes on square grid. FIG. 58 is an exploded view showing domes and light generation elements of an embodiment of an inventive illuminated detectable warning surface. FIG. 59 is a perspective view of a 24"×24" panel unit of the inventive illuminated detectable warning surface. FIG. 60 is a side view of a single dome showing the relative dimensions of the dome in conformance with the guidelines of the American With Disabilities Act. FIG. 61 is a perspective view of the single dome shown in Figure C. FIG. 62 is a cross section side view showing a single dome of an embodiment of the inventive illuminated detectable warning surface.

Figure 63:
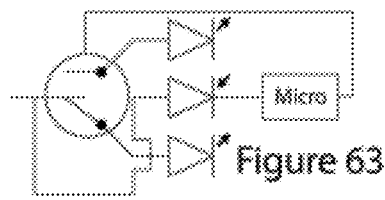
FIG. 63 is a circuit schematic showing an sensing/switching LED redundancy circuit in accordance with an exemplary embodiment of the inventive illuminated detachable warning surface.

FIG. 63 is a circuit schematic showing an sensing/switching LED redundancy circuit in accordance with an exemplary embodiment of the inventive illuminated detachable warning surface. The circuit detect, for example, during a calibration operation or during service, the emission of light from one or more LED emitters (for example, from a first packaged LED lamp). If the detected emission is not within a predetermined specification, a microprocessor controls a switch so that an alternate light source (for example, a second packaged LED lamp) can be brought online to replace a failed first packaged LED lamp. Other configurations are possible, for example, three or more independent or co-packaged light sources can be used. The light emitting device could be operated simultaneously, for example, both at half brightness, and then if one fails, the other light emitting device is then driven at full brightness (or other appropriate proportion).

Figure 65:
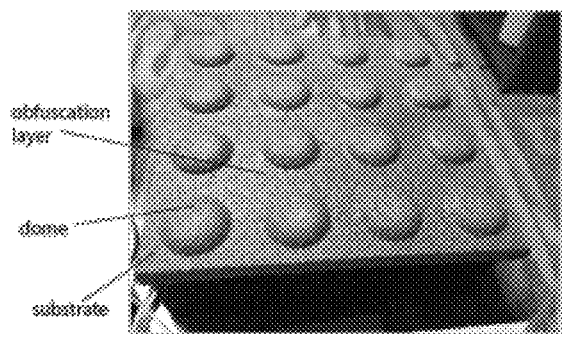
FIG. 65 is a photograph showing the prototype version having an obscuring layer hiding the electronics of the prototype version.
Figure 64:
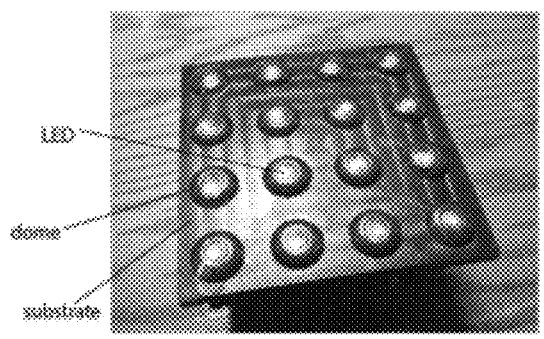
FIG. 64 is a photograph showing a prototype version of the inventive illuminated detectable warning surface having cast-in-place light guides and cast-in-place encapsulating bulk.
Figure 66:
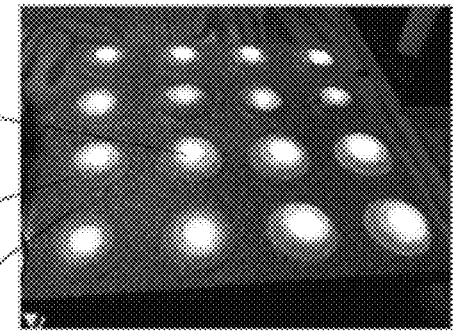
FIG. 66 is a photograph of the prototype version with an individually addressable RGB LEDs light source lit up.
Figure 67:
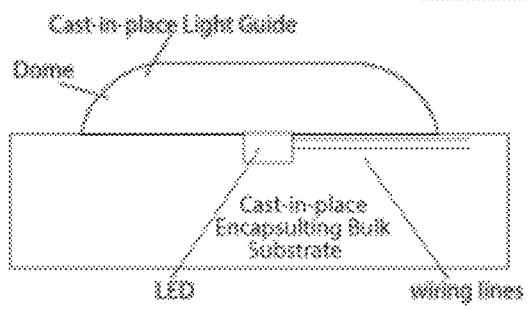
FIG. 67 is a cross section side view showing a cast-in-place light guide and encapsulating bulk substrate with embedded LEDS of an embodiment of the inventive illuminated detectable warning surface.

FIG. 64 is a photograph showing a prototype version of the inventive illuminated detectable warning surface having cast-in-place light guides and cast-in-place encapsulating bulk. FIG. 65 is a photograph showing the prototype version having an obscuring layer hiding the electronics of the prototype version. FIG. 66 is a photograph of the prototype version with an individually addressable RGB LEDs light source lit up. FIG. 67 is a cross section side view showing a cast-in-place light guide and encapsulating bulk substrate with embedded LEDS of an embodiment of the inventive illuminated detectable warning surface.

Figure 68:
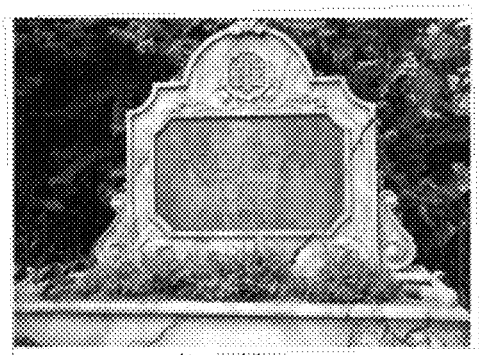
FIG. 68 is a photograph showing an exemplary application for the inventive light paver used for a theme park ride monument.
Figure 69:
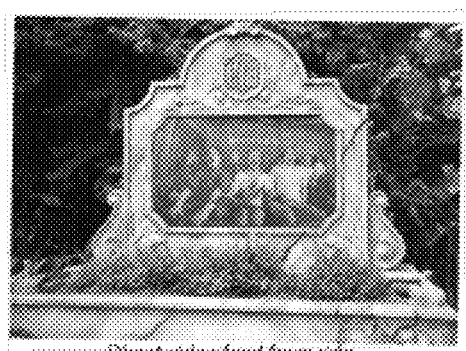
FIG. 69 is a photograph of the theme park ride monument showing a direct video feed from the theme park ride viewable through an obscuring layer.
Figure 70:
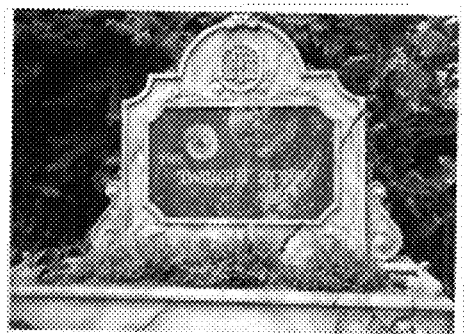
FIG. 70 is a photograph of the theme park ride monument showing an animation viewable through the obscuring layer.

FIG. 68 is a photograph showing an exemplary application for the inventive light paver used for a theme park ride monument. FIG. 69 is a photograph of the theme park ride monument showing a direct video feed from the theme park ride viewable through an obscuring layer. In this case the light source may include a light emitting display comprising one of a CRT, OLED, LED, LCD capable of displaying a video image. FIG. 70 is a photograph of the theme park ride monument showing an animation viewable through the obscuring layer. The obscuring layer may be formed from a thin layer of a light transmissive adhesive material on the viewable surface of the light emitting display. Light obscuring particulate is adhered to the light transmissive adhesive material so that the light generation element is obscured when the viewable surface is viewed when light is not generated from the light generation element and when light is generated, a portion of the light generated by the light generation element is transmitted from the viewable surface.

Figure 71:
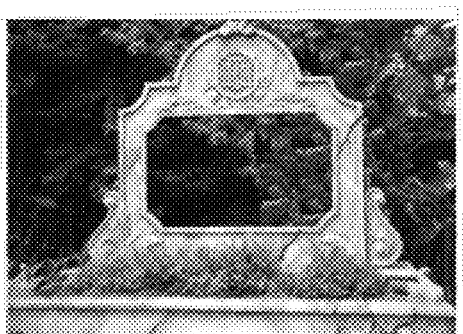
FIG. 71 is a photograph of the theme park ride monument showing a "cloaking" image giving the appearance of transparency.
Figure 72:
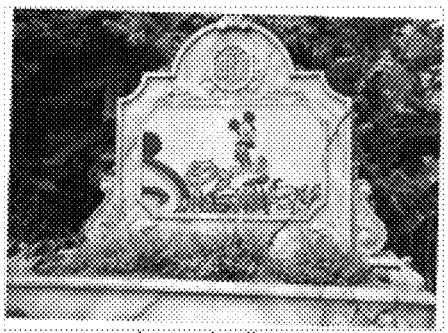
FIG. 72 is a photograph of the theme park ride monument showing a logo animation viewable through the obscuring layer.
Figure 73:
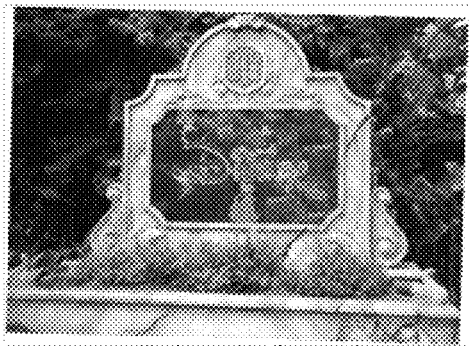
FIG. 73 is a photograph of the theme park ride monument showing a logo animation appearing to float within the cloaking image.
Figure 74:
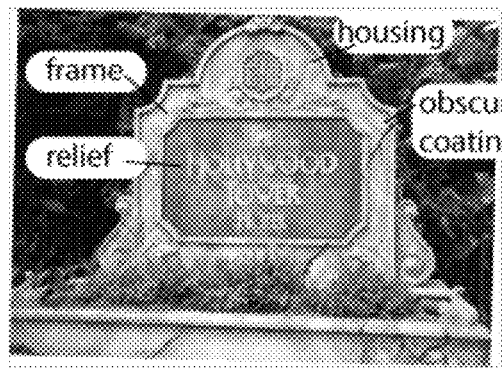
FIG. 74 is a photograph showing the theme park ride monument having a glowing relief viewable through the obscuring layer.
Figure 75:
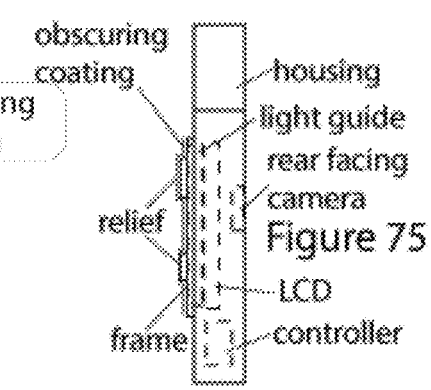
FIG. 75 is a side view of the theme park ride monument.
Figure 76:
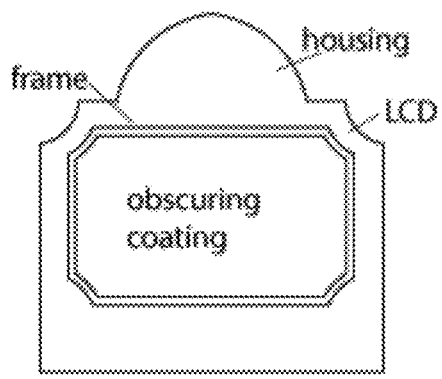
FIG. 76 is a front view of the theme park ride monument showing an obscuring layer hiding a light source.
Figure 77:
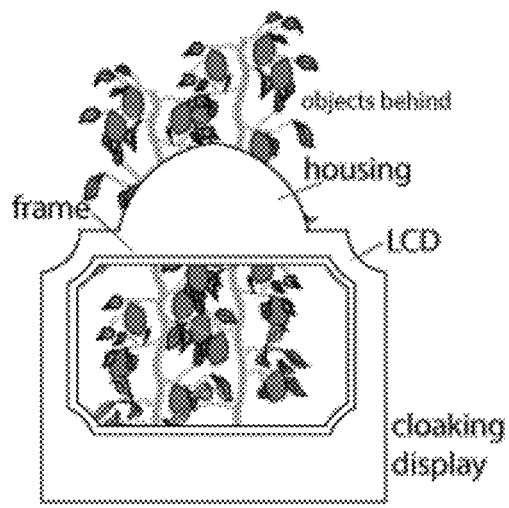
FIG. 77 is a front view of the theme park ride monument showing a cloaking display shown on a video light source.
Figure 78:
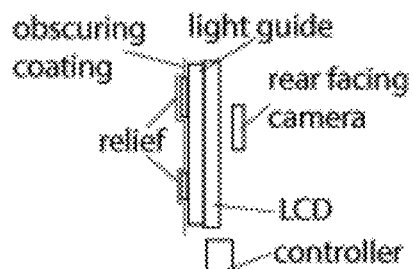
FIG. 78 is an isolated view of some of the image generating components of the theme park ride monument.
Figure 79:
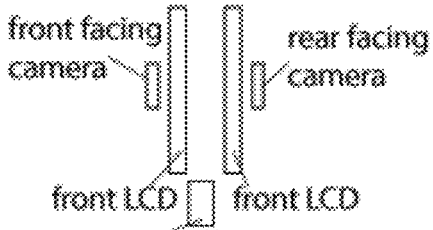
FIG. 79 is an isolated view showing a two sided cloaking system.

FIG. 71 is a photograph of the theme park ride monument showing a "cloaking" image giving the appearance of transparency. FIG. 72 is a photograph of the theme park ride monument showing a logo animation viewable through the obscuring layer. FIG. 73 is a photograph of the theme park ride monument showing a logo animation appearing to float within the cloaking image. FIG. 74 is a photograph showing the theme park ride monument having a glowing relief viewable through the obscuring layer. FIG. 75 is a side view of the theme park ride monument. FIG. 76 is a front view of the theme park ride monument showing an obscuring layer hiding a light source. FIG. 77 is a front view of the theme park ride monument showing a cloaking display shown on a video light source. FIG. 78 is an isolated view of some of the image generating components of the theme park ride monument. FIG. 79 is an isolated view showing a two sided cloaking system.

The theme park ride monument includes an exemplary embodiment of an inventive apparatus that has a light source embedded in a bulk. The light source comprises at least one light generation element and at least one light guide associated with a respective said at least one light generation element. The bulk having a viewable surface for viewing the light generated from the light source. The light guide has a light receiving side optically coupled with the light generation element and a light transmitting side having a viewable end associated with the viewable surface. The bulk may substantially encapsulate the light source with no air gap.

Figure 80:
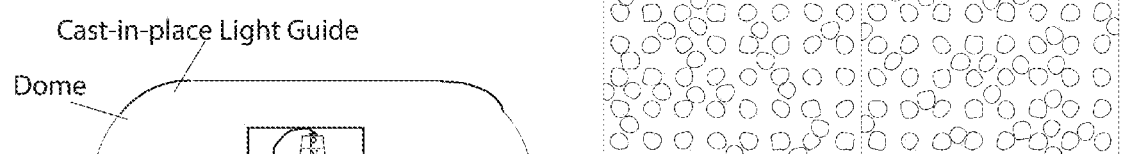
FIG. 80 is a cross sectional view of a cast-in-place light guide lens and cast-in-place encapsulating bulk forming the inventive light paver having a substantially solid-state structure.
Figure 81:
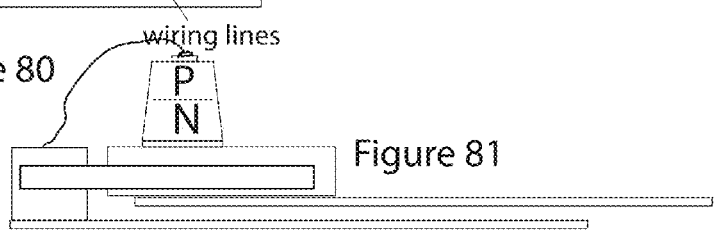
FIG. 81 is an isolate cross sectional view within the dashed curve shown in FIG. 80, showing the detail of the cast-in-place light guide lens and cast-in-place encapsulating bulk formed around an already-solid state packaged LED lamp.

FIG. 80 is a cross sectional view of a cast-in-place light guide lens and cast-in-place encapsulating bulk forming the inventive light paver having a substantially solid-state structure. FIG. 81 is an isolate cross sectional view within the dashed curve shown in FIG. 80, showing the detail of the cast-in-place light guide lens and cast-in-place encapsulating bulk formed around an already-solid state packaged LED lamp thereby forming the inventive light paver having a substantially solid-state structure.

Typically, a heat generating electrical component (such as the packaged LED shown in FIGS. 80 and 81) is protected from overheating through the use of a thermally conductive heat sink. Often, the heat sink is made from a metal, such as aluminum and because the heat sink is electrically conductive, the heat sink and the electrical component must be electrically isolated. Also, the use of the heat sink to remove heat quickly from the electrical component is a typically desired feature when engineering the heat sink material used, shape and size, and ability to remove heat from the electrical component. However, many failures of heat generating electrical components are due to thermal shock, the rapid change in temperature caused by the functioning or service conditions of the electrical component. For example, solder joints may crack, wire bonds may loosen and the crystalline structure of semiconductor material may undergo fractures due to a rapid change in thermal conditions. Accordingly, the rapid conduction of heat away from the electrical component as is typically designed of using heat sinks may be detrimental or at least not adequately protect against failures caused by a rapid change in thermal conditions.

In accordance with this aspect of the invention, an encapsulation material is provided for an electronic device. For example, the electronic device may comprise an embodiment of the inventive light paver, detectable warning surface, a hand held communication device, a computer, a video monitor, a cell phone, a lighting device, or other device that generates heat due to electrons. The encapsulation material includes a binder; and a heat absorbing particulate dispersed within the binder. The heat absorbing particulate absorbs heat generated from an electronic element of the electronic device to prevent the electronic element from experiencing thermal shock. The encapsulation material acts as a thermal "spring" by quickly absorb heat energy from the electronic device while locking in and constraining the physical elements making up the electronic device. Mechanical, electrical and optical coupling is maintained among the coupled elements even if a fracture or dislocation occurs of a conducting or optical, or other performing, material making up the electronic device or a printed circuit board on which the device is mounted. The heat absorbing particulate may be electrically non-conductive, and have a relatively fast (as compared to, for example, the binder) heat absorption capability, such as soapstone powder. The heat absorbing particulate may include an electrically conductive material that is prevented from shorting the electronic devices, such as a micro-encapsulated aluminum powder having a polymer shell, or a fine metal powder dispersed within the binder so that the longest linear dimension of any conductive particulate aggregation is less than the minimum feature needed to cause a short in the electronic device. The heat absorbing particulate may include a phase change material, and the encapsulating bulk may be formed so that strata or defined patches of the heat absorbing material are formed. For example, pads of phase change material can be formed at the top surface of the encapsulating bulk with the electronic devices fixed thereon. The encapsulation material surrounds and fixes against movement of heat expanding or shock receiving components of the electronic element. As an example, a substantial solid state electronic device can be formed, as shown in FIGS. 80 and 81 so that there are no air gaps (other then, perhaps, entrapped air bubbles). This solid state structure creates a macro device (e.g., a light paver) that can withstand significant weight, even supporting a fire truck. At the same time, the solid state structure can be seen down to the microscopic feature size to lack any highly compressible locations (such as would occur in an air gap) holding in place and restricting against movement of elements making up the electronic device, including wire bonds and solder joints, caused by thermal expansion.

The encapsulation material can be include a photoactive binder. The encapsulation material forms a bulk that may be an electrically insulating moisture barrier in direct contact with the light source for preventing moisture from infiltrating the light source while preventing shorting of electrically conductive elements forming the light source or ancillary electronics. The bulk may comprise a composite material including a polymer binder with filler materials. The polymer binder may comprise, for example, an epoxy resin, a thermal forming plastic, a thermal setting adhesive, a hot melt adhesive. The binder may included additives to improve the properties and performance of the encapsulation material. For example, a filler material that includes at least one of stone powder, desiccant (moisture getter), oxygen getter (to prevent corrosion), aggregate (stone chips), hydraulic mortar, soapstone powder, calcium carbonate (marble dust), etc. The filler material could also include a radiation blocking composition, such as lead powder. The inventive light paver can be radiation hardened by including lead bearing particulate as filler and using fiber optic light guide so that radiation does not have direct path to electronics. The heat absorbing properties of bulk reduces thermal shock (source of cracks and fractures in semiconductors devices and discrete electronics and solder joints is thermal shock not necessarily temperature extremes but rapid change between temperatures (check to see if there is data available on this). Phase change material included in bulk and can be located at site of the sites of heat generation (electrical components, e.g., LEDs).

The invention claimed is:

1. A method, comprising:
   providing a light source embedded in a bulk, the light source comprising at least one light generation element, the bulk having a viewable surface for viewing the light generated from the light source;
   forming an obscuring layer on the viewable surface for obscuring said at least one light generation element when light is not generated from the light generation element the obscuring layer comprising a thin layer of a light transmissive adhesive material formed on the viewable surface; and
   adhering light obscuring particulate to the light transmissive adhesive material so that the light generation element is obscured when the viewable surface is viewed when light is not generated from the light generation element and when light is generated, a portion of the light generated by the light generation element is transmitted from the viewable surface.

2. The method according to claim 1, wherein the light generation element comprises at least one light emitting diode.

3. The method according to claim 1, wherein the light generation element comprises a matrix of light emitting diodes.

4. The method according to claim 1, wherein the light generation element comprises a light emitting display comprising one of a CRT, OLED, LED, LCD capable of displaying a video image.

5. The method according to claim 1, wherein the light transmissive adhesive material is applied as a thin coating; then the light obscuring particulate is applied to the thin coating of light transmissive adhesive material, wherein the thin coating of light transmissive material is capable of adhering an adhered portion of the light obscuring particulate; then allowing the light transmissive adhesive material to harden, then removing a non-adhered portion of the light obscuring particulate leaving behind the light transmissive adhesive material having the adhered portion of light obscuring particulate so that the light generation element is obscured when the viewable surface is viewed when light is not generated from the light generation element and when light is generated, a portion of the light generated by the light generation element is transmitted from the viewable surface.

6. An apparatus, comprising:
a light source embedded in a bulk, the light source comprising at least one light generation element and at least one light guide associated with a respective said at least one light generation element, the bulk having a viewable surface for viewing the light generated from the light source, the at least one light guide having a light receiving side optically coupled with said respective said at least one light generation element and a light transmitting side having a viewable end associated with the viewable surface, wherein the bulk substantially encapsulates the light source with no air gap, wherein the light source comprises a light emitting display comprising one of a CRT, OLED, LED, LCD capable of displaying a video image.

7. The apparatus according to claim 6, wherein the bulk comprises an electrically insulating moisture barrier in direct contact with the light source for preventing moisture from infiltrating the light source while preventing shorting of electrically conductive elements forming the light source or ancillary electronics.

8. The apparatus according to claim 6, wherein the bulk comprises a composite material including a polymer binder with filler materials.

9. The apparatus according to claim 6, wherein the polymer binder comprises an epoxy resin.

10. The apparatus according to claim 6, wherein the filler materials include at least one of stone powder, desiccant acting as a moisture getter, oxygen getter, aggregate, hydraulic mortar, soapstone powder, and calcium carbonate.

11. The apparatus according to claim 6, wherein the bulk has a compressive strength at least capable of supporting a fire truck.

12. The apparatus according to claim 6, further comprising the bulk being radiation hardened by including radiation blocking particulate as filler and using a fiber optic light guide so that radiation does not have direct path to electronics.

13. The apparatus according to claim 6, wherein the bulk is selected so that heat absorbing properties of the bulk reduces thermal shock to prevent cracks and fractures in electronics and solder joints.

14. The apparatus according to claim 6, wherein phase change material is included in bulk and selectively located heat generation sources.

15. A detectable warning surface, comprising: a light source; and a bulk encapsulating the light source, the bulk comprises a substrate having a pattern of raised domes provided on a top surface, wherein the light source is protected by the bulk and light generated by the light source is transmitted from at least one of the top surface and the raised domes, wherein the light source comprises at least one a matrix of light emitting diodes and a light emitting display capable of displaying a video image.

16. A detectable warning surface according to claim 15, further comprising an obscuring layer on a viewable surface of the detectable warning surface for obscuring the light generation source when light is not generated from the light source.

17. A detectable warning surface according to claim 16, wherein the obscuring layer comprises a thin layer of a light transmissive adhesive material disposed on the viewable surface;
and light obscuring particulate included in the light transmissive adhesive material so that the light source is obscured when the viewable surface is viewed when light is not generated from the light source and when light is generated from the light source, a portion of the light generated by the light source is transmitted from the viewable surface.

18. A detectable warning surface according to claim 15, wherein the bulk comprises an electrically insulating moisture barrier in direct contact with the light source for preventing moisture from infiltrating the light source while preventing shorting of electrically conductive elements forming the light source or ancillary electronics.

* * * * *